United States Patent
Touyama et al.

(10) Patent No.: US 10,656,746 B2
(45) Date of Patent: May 19, 2020

(54) INFORMATION PROCESSING DEVICE, INFORMATION PROCESSING METHOD, AND PROGRAM

(71) Applicant: SONY CORPORATION, Tokyo (JP)

(72) Inventors: Keisuke Touyama, Tokyo (JP); Kae Nagano, Tokyo (JP); Tomohiro Ishii, Tokyo (JP); Kozue Sasaki, Tokyo (JP); Kazuhiro Toma, Kanagawa (JP); Nobuaki Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/744,279

(22) PCT Filed: Jun. 15, 2016

(86) PCT No.: PCT/JP2016/067801
§ 371 (c)(1),
(2) Date: Jan. 12, 2018

(87) PCT Pub. No.: WO2017/047180
PCT Pub. Date: Mar. 23, 2017

(65) Prior Publication Data
US 2018/0210597 A1    Jul. 26, 2018

(30) Foreign Application Priority Data

Sep. 18, 2015   (JP) .................... 2015-184893

(51) Int. Cl.
*G06F 3/041*    (2006.01)
*G06F 3/0488*   (2013.01)

(52) U.S. Cl.
CPC .......... *G06F 3/0414* (2013.01); *G06F 3/0416* (2013.01); *G06F 3/04883* (2013.01); *G06F 3/04886* (2013.01); *G06F 2203/04104* (2013.01); *G06F 2203/04808* (2013.01)

(58) Field of Classification Search
CPC .............................................. G06F 3/041–048
See application file for complete search history.

(56) References Cited

U.S. PATENT DOCUMENTS

| 2008/0068343 A1* | 3/2008 | Hoshino ................. G06F 3/016 345/173 |
| 2008/0088593 A1* | 4/2008 | Smoot .................. G06F 3/0425 345/173 |
| 2008/0180404 A1 | 7/2008 | Han et al. |

(Continued)

FOREIGN PATENT DOCUMENTS

| JP | 2008-123032 A | 5/2008 |
| JP | 2008-192092 A | 8/2008 |

(Continued)

*Primary Examiner* — Sanjiv D. Patel
(74) *Attorney, Agent, or Firm* — Paratus Law Group, PLLC

(57) ABSTRACT

There is provided an information processing device, an information processing method, and a program which are capable of increasing types of processes that can be implemented by a touch operation using a plurality of fingers, the information processing device including: a processing executing unit configured to execute a predetermined process on the basis of a combination of results of detecting touch strengths of a plurality of fingers on an operation surface.

23 Claims, 30 Drawing Sheets

(56) References Cited

U.S. PATENT DOCUMENTS

| | | | | |
|---|---|---|---|---|
| 2010/0026647 A1* | 2/2010 | Abe | .................... | G06F 3/04883 345/173 |
| 2012/0056837 A1* | 3/2012 | Park | ..................... | G06F 3/0414 345/173 |
| 2012/0113061 A1* | 5/2012 | Ikeda | ..................... | G06F 3/041 345/175 |
| 2013/0088434 A1* | 4/2013 | Masuda | ................ | G06F 1/3262 345/173 |
| 2013/0132903 A1* | 5/2013 | Krishnaswamy | ... | G06F 3/04883 715/825 |
| 2016/0110046 A1* | 4/2016 | Yao | ....................... | G06F 3/0485 715/784 |

FOREIGN PATENT DOCUMENTS

| | | |
|---|---|---|
| JP | 2009-151505 A | 7/2009 |
| JP | 2009-301094 A | 12/2009 |
| JP | 2011-048665 A | 3/2011 |
| JP | 2013-025580 A | 2/2013 |
| JP | 2013-539580 A | 10/2013 |
| JP | 2013-242645 A | 12/2013 |
| JP | 2015-022625 A | 2/2015 |

* cited by examiner

FIG. 4
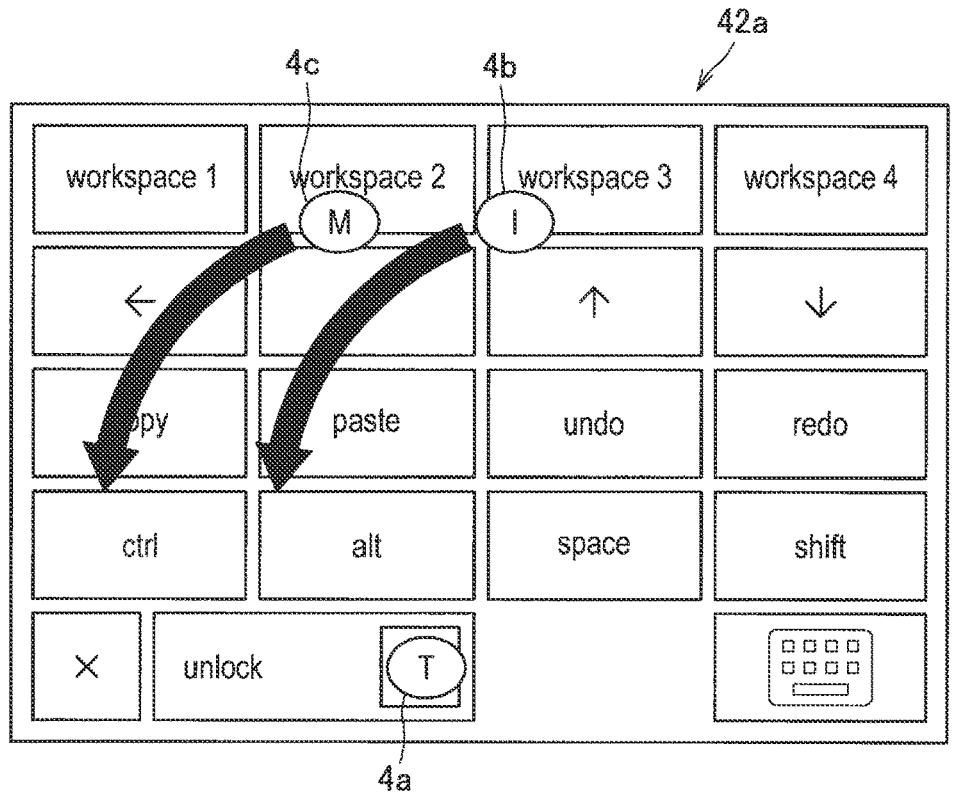
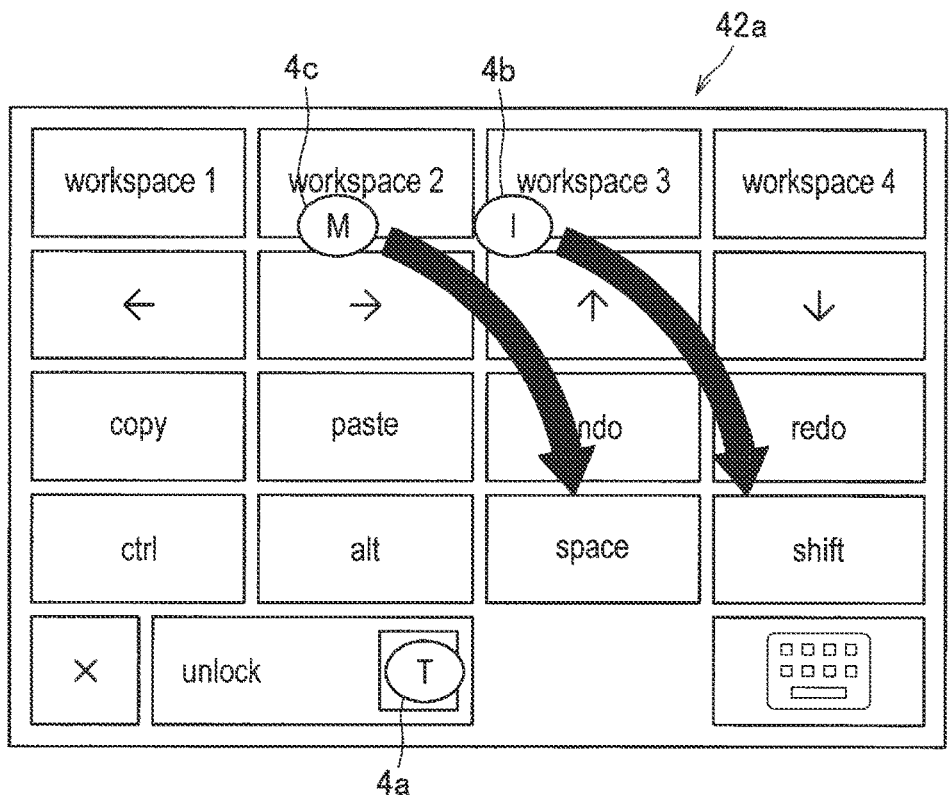

FIG. 5
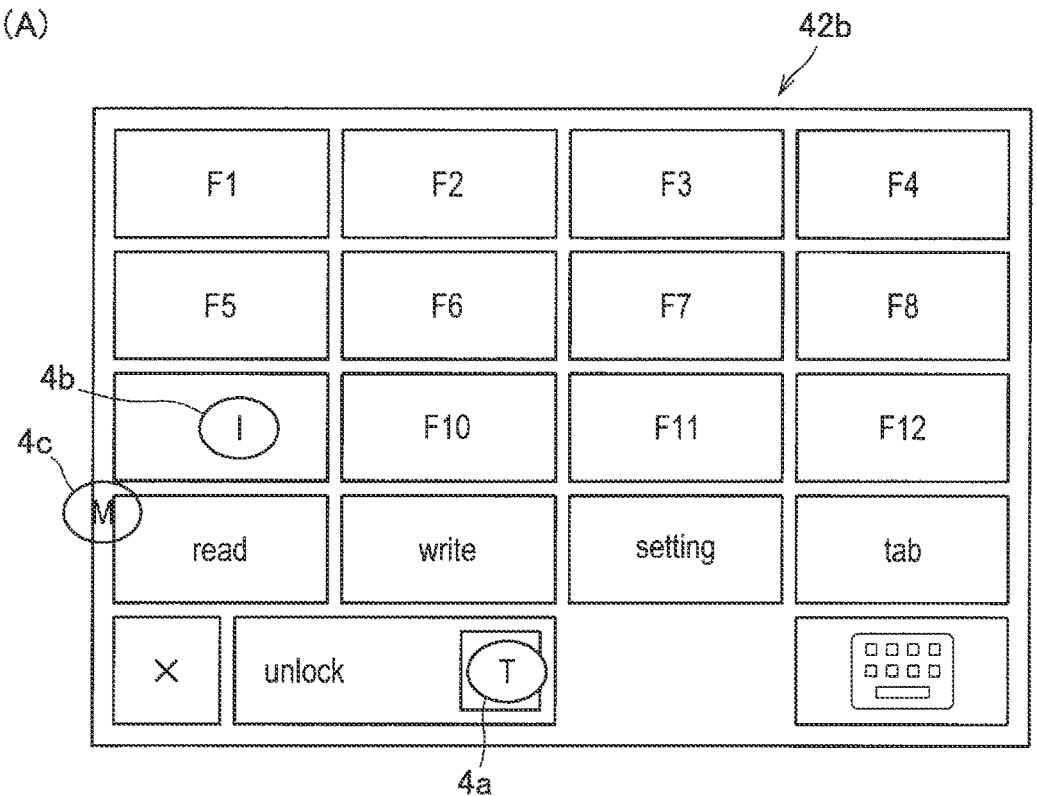
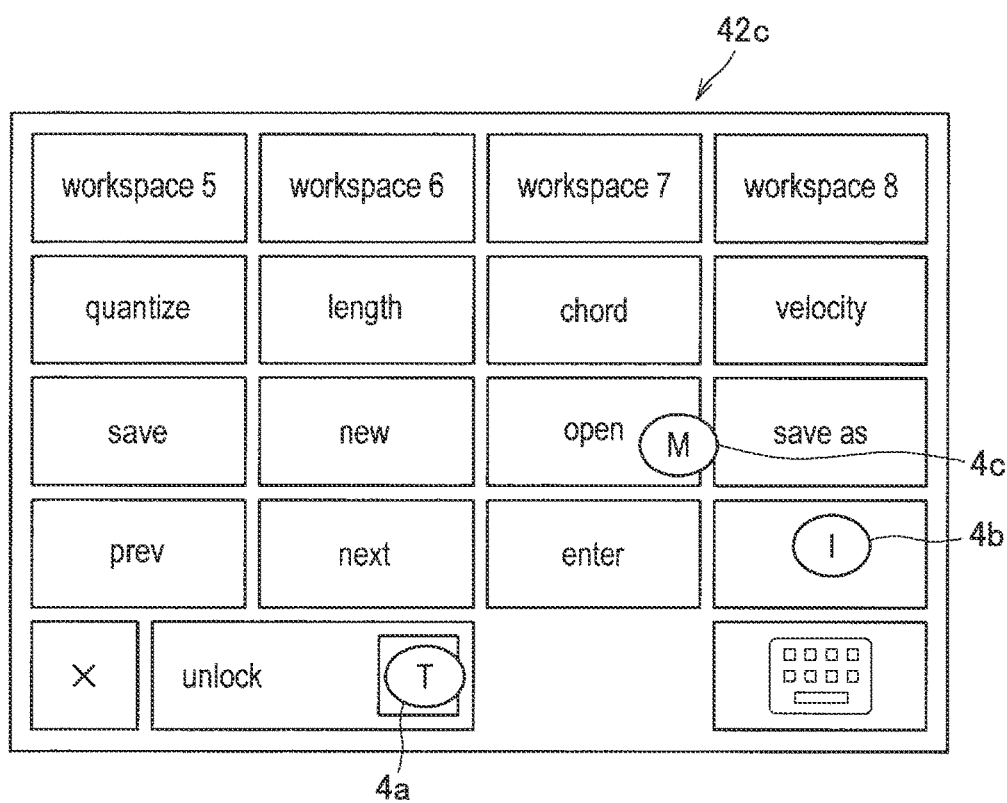

FIG. 7
(A)
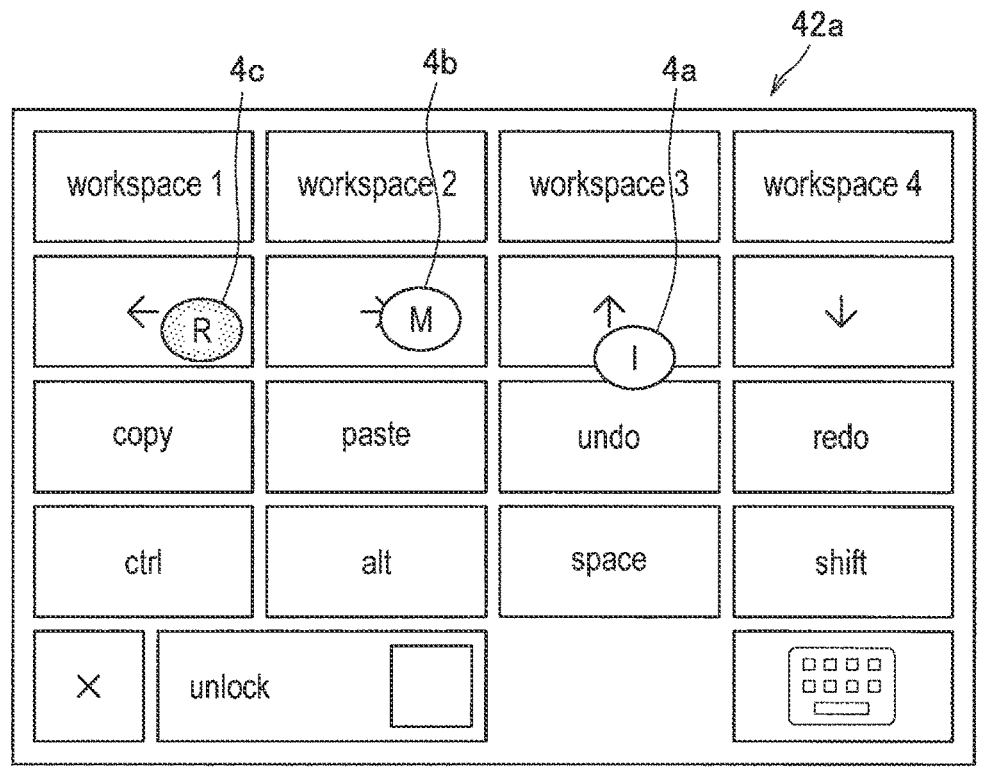
(B)
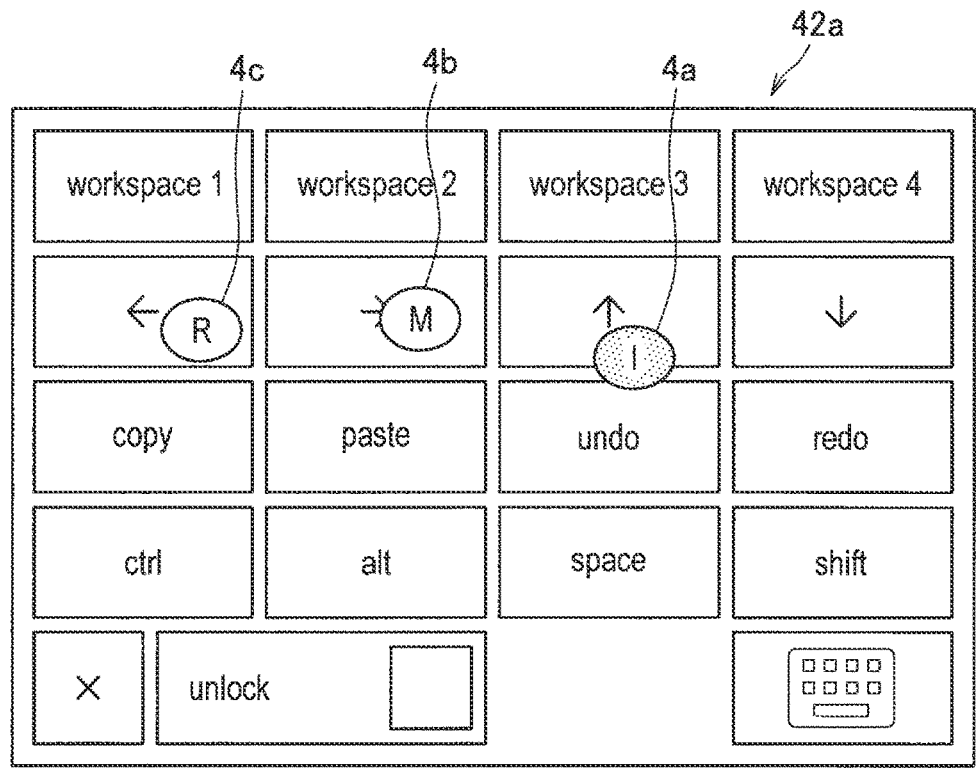

FIG. 8
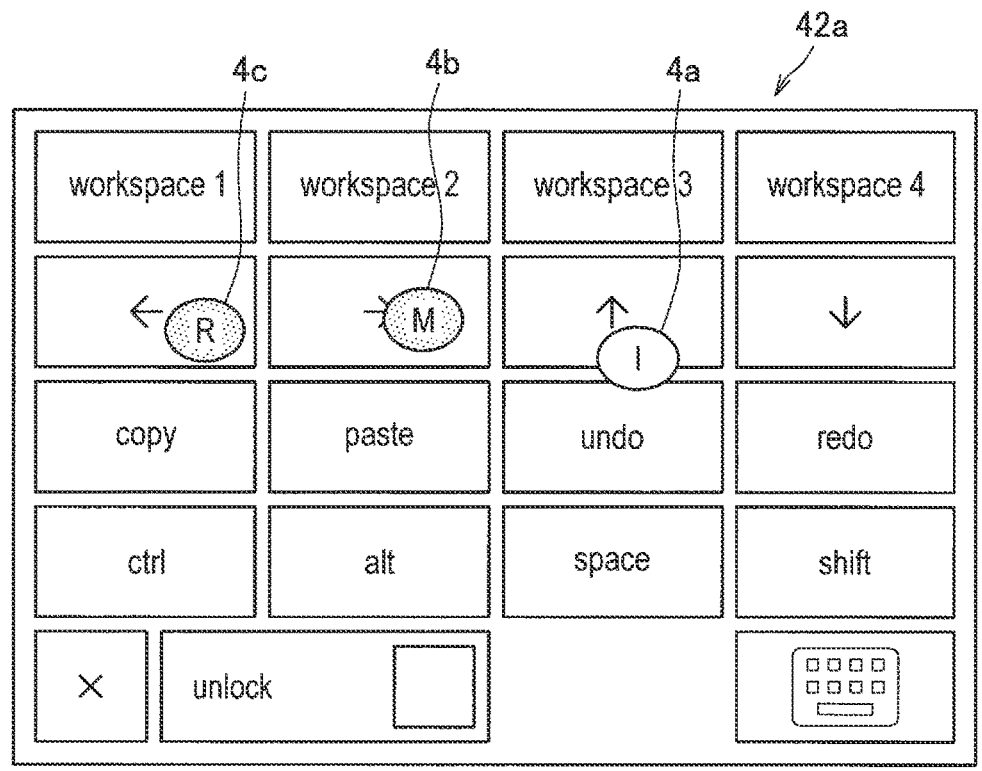
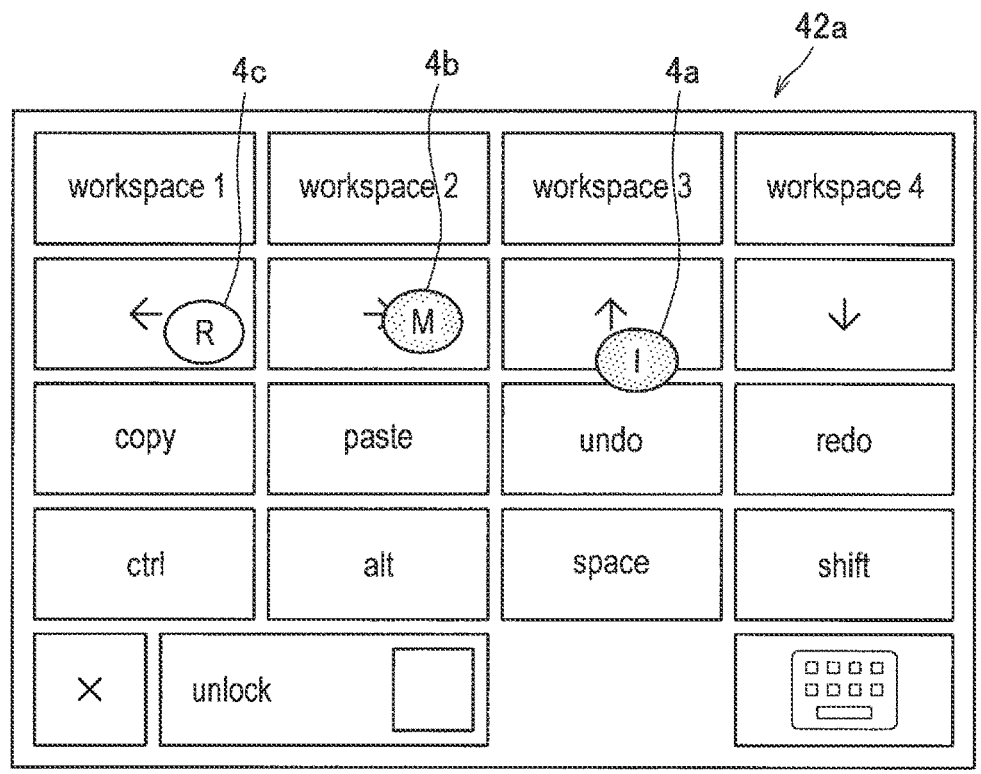

FIG. 9
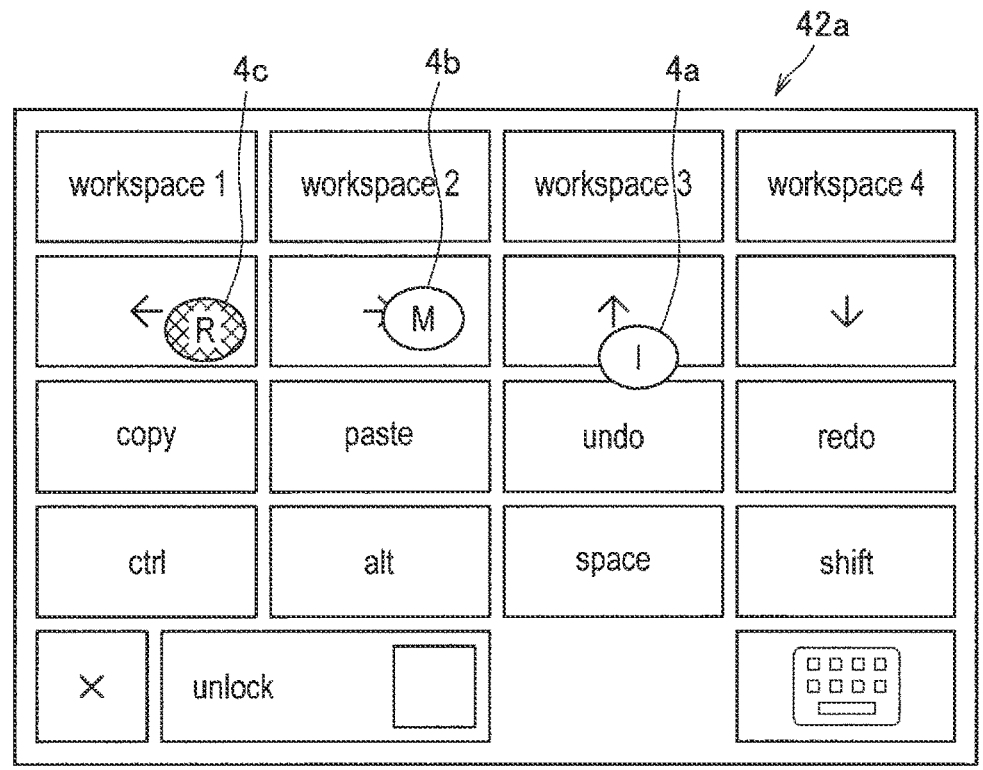
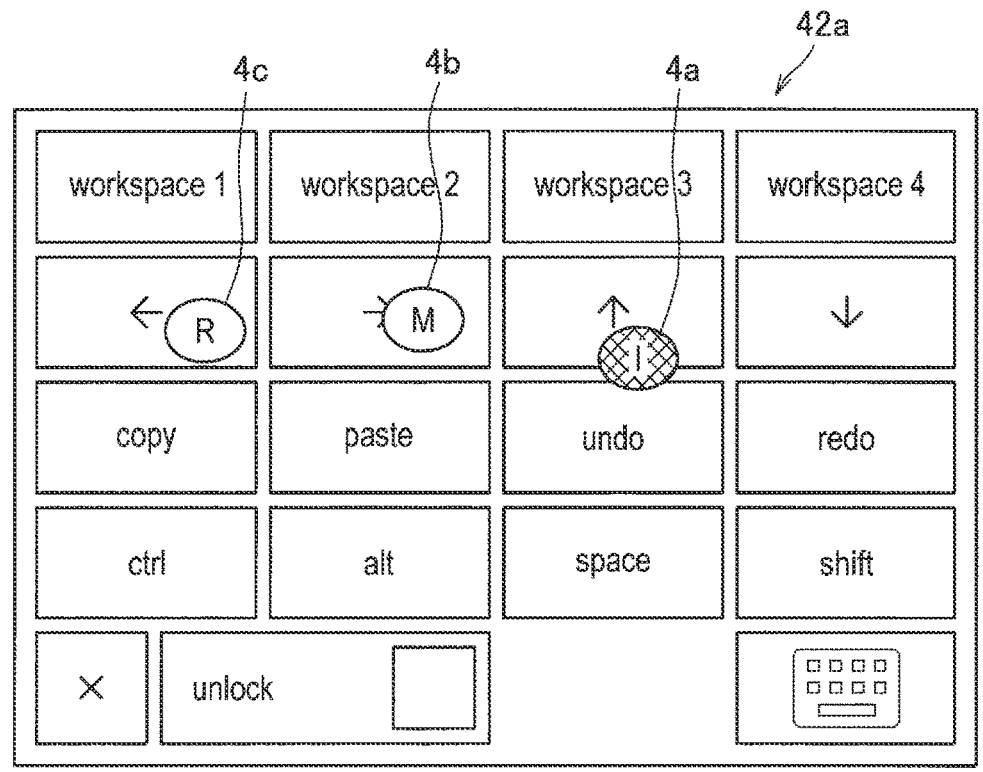

FIG. 10
(A)
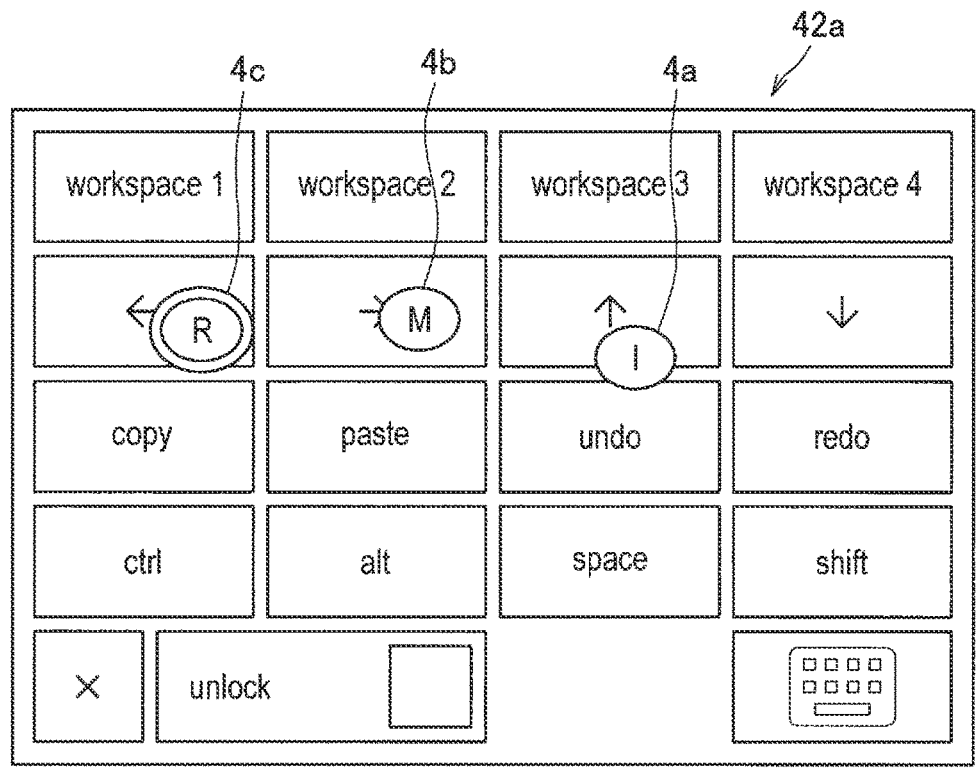
(B)
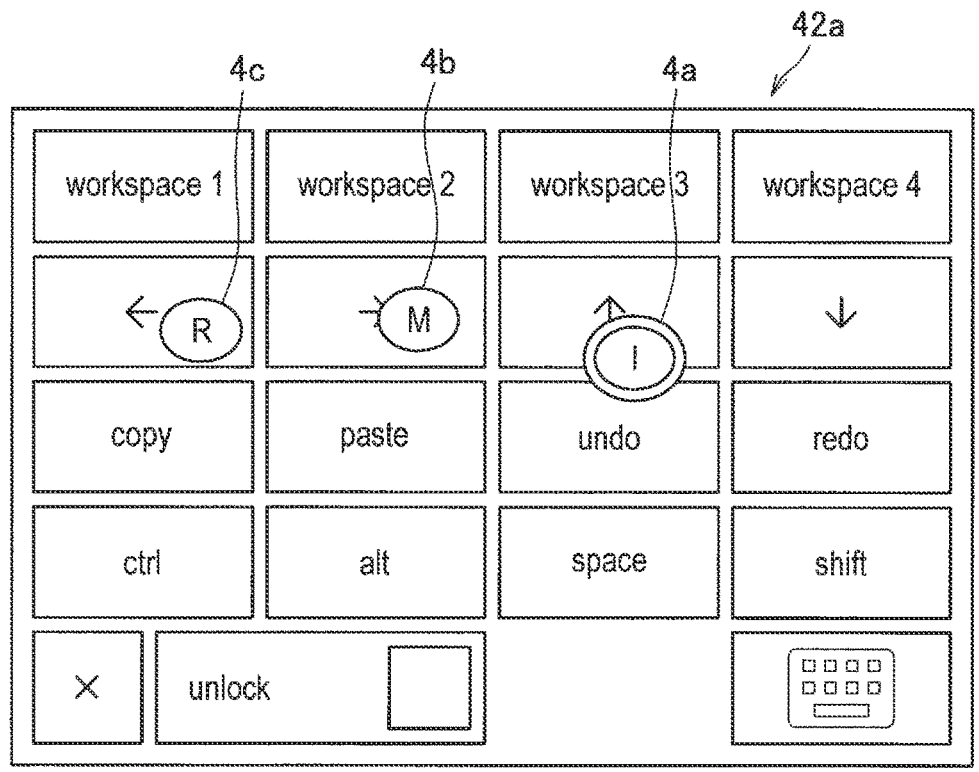

FIG. 11
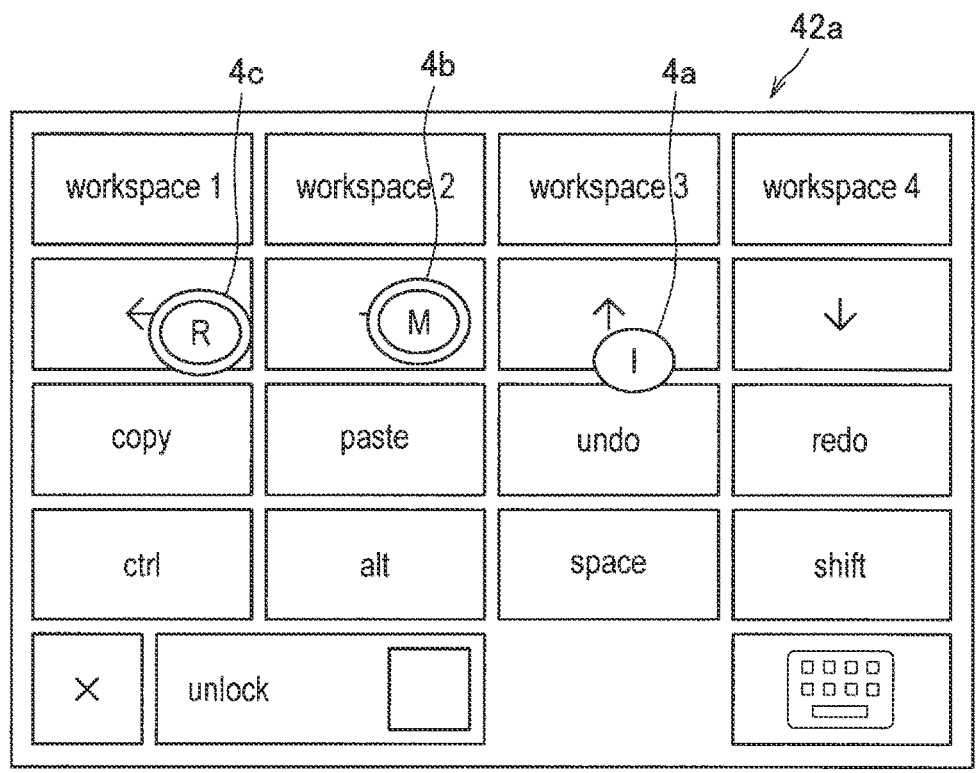
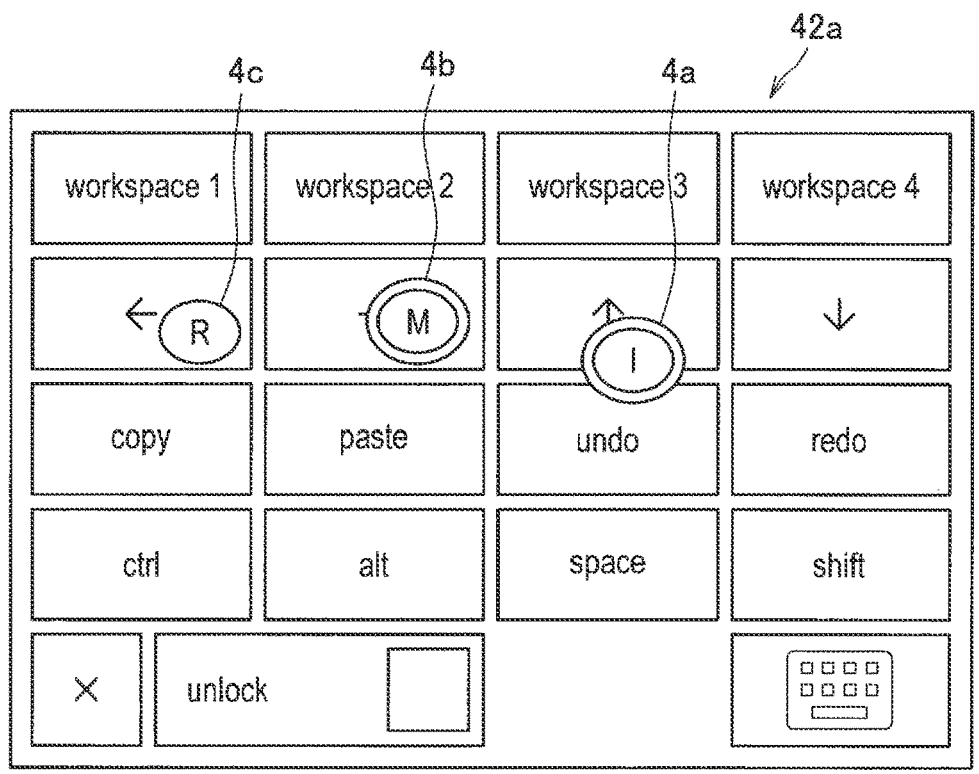

FIG. 12
(A)
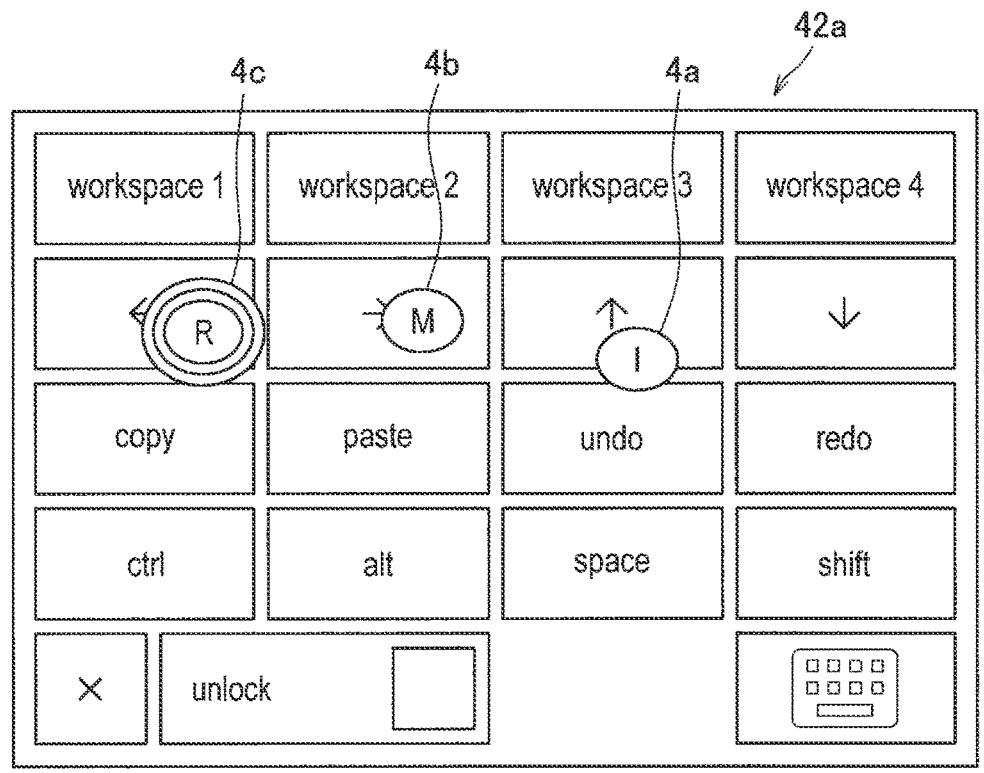
(B)
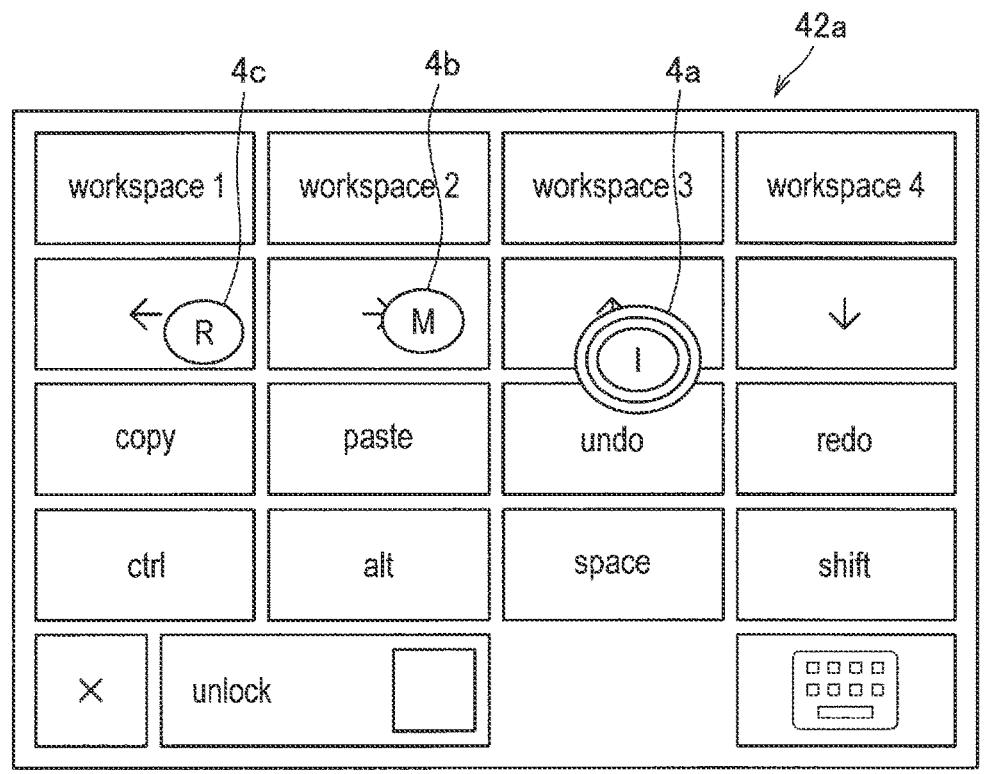

FIG. 13
(A)
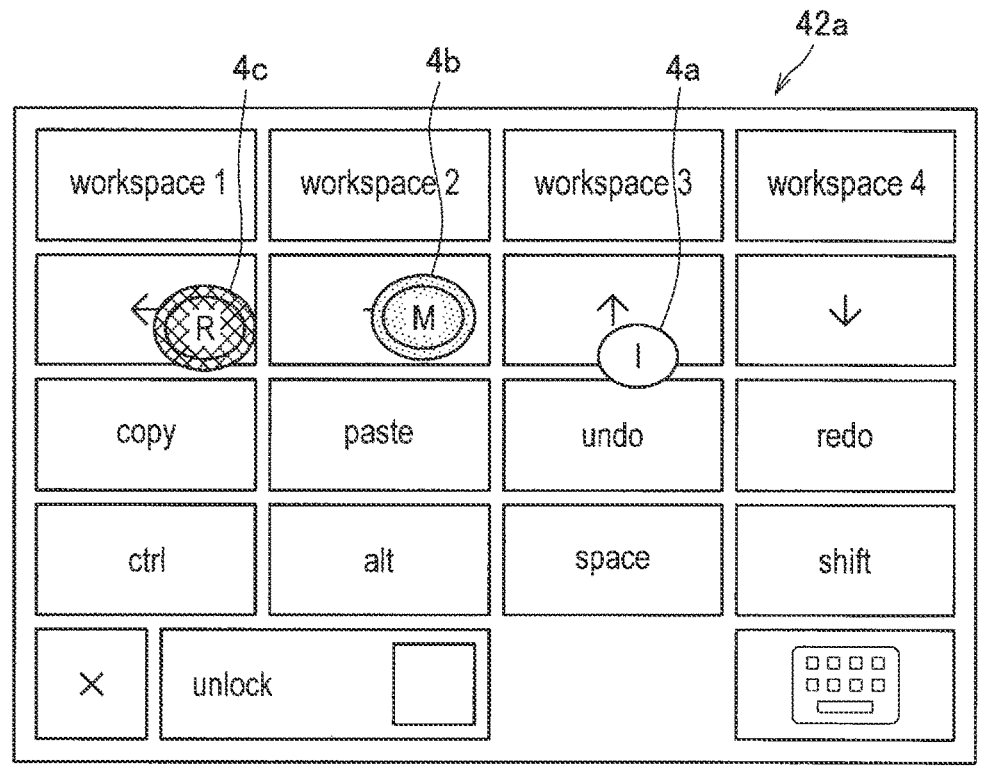
(B)
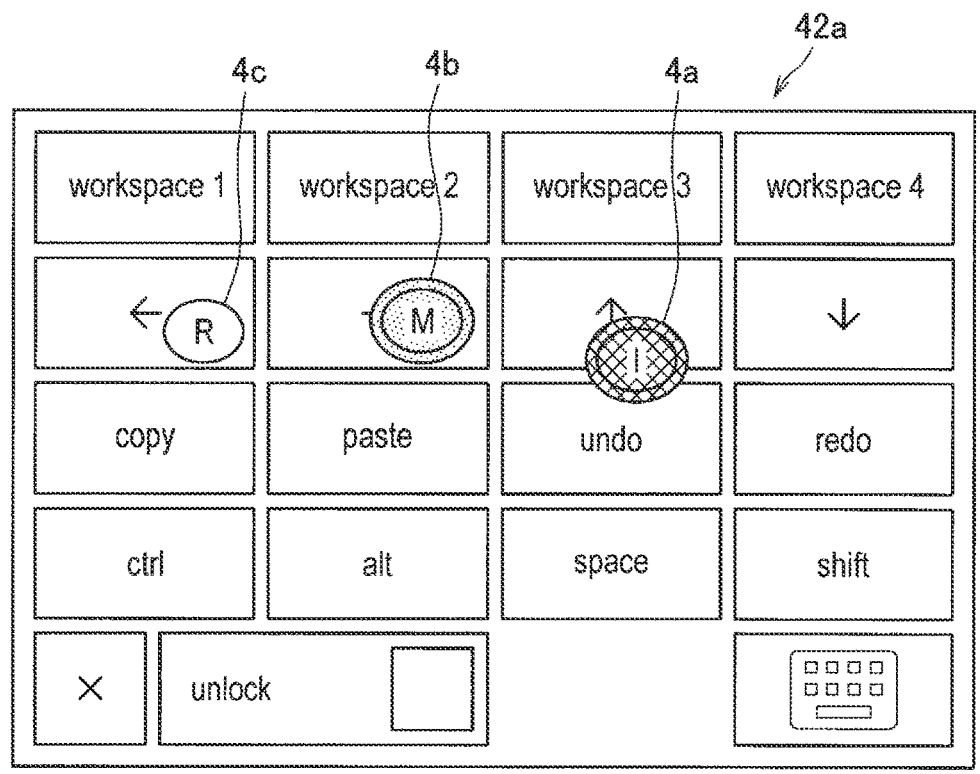

FIG. 14
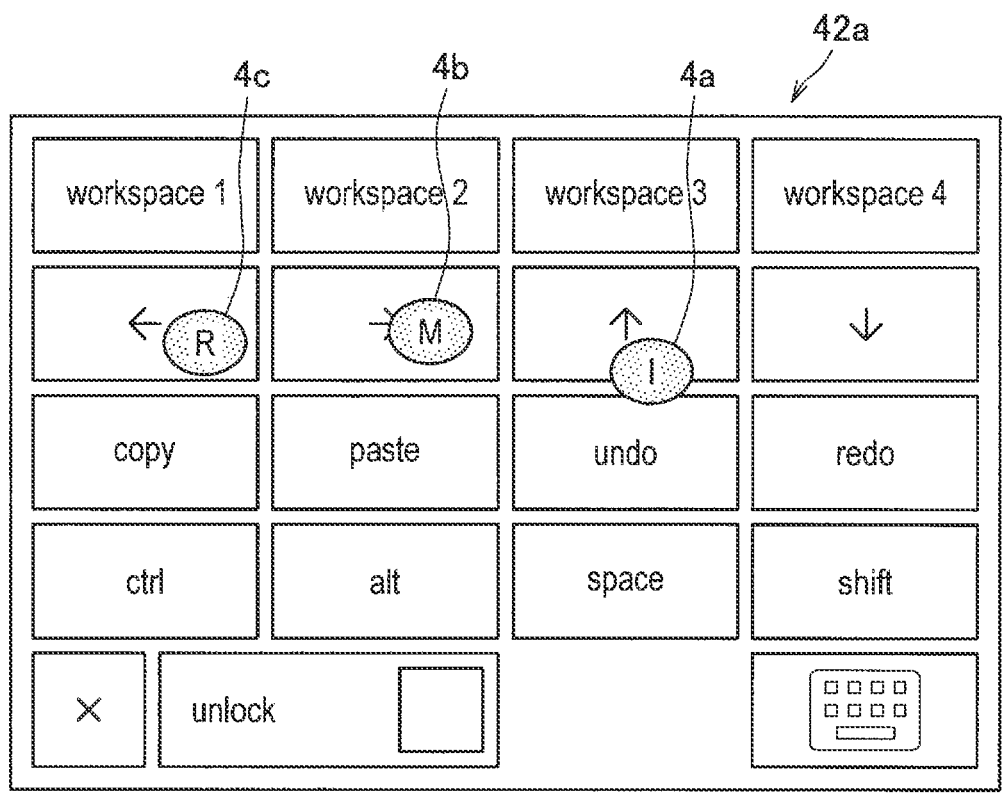
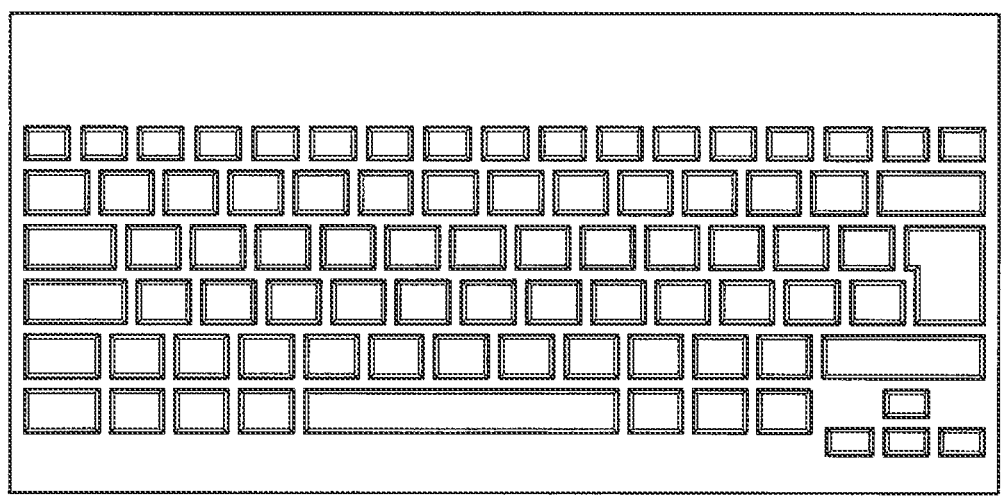

FIG. 15
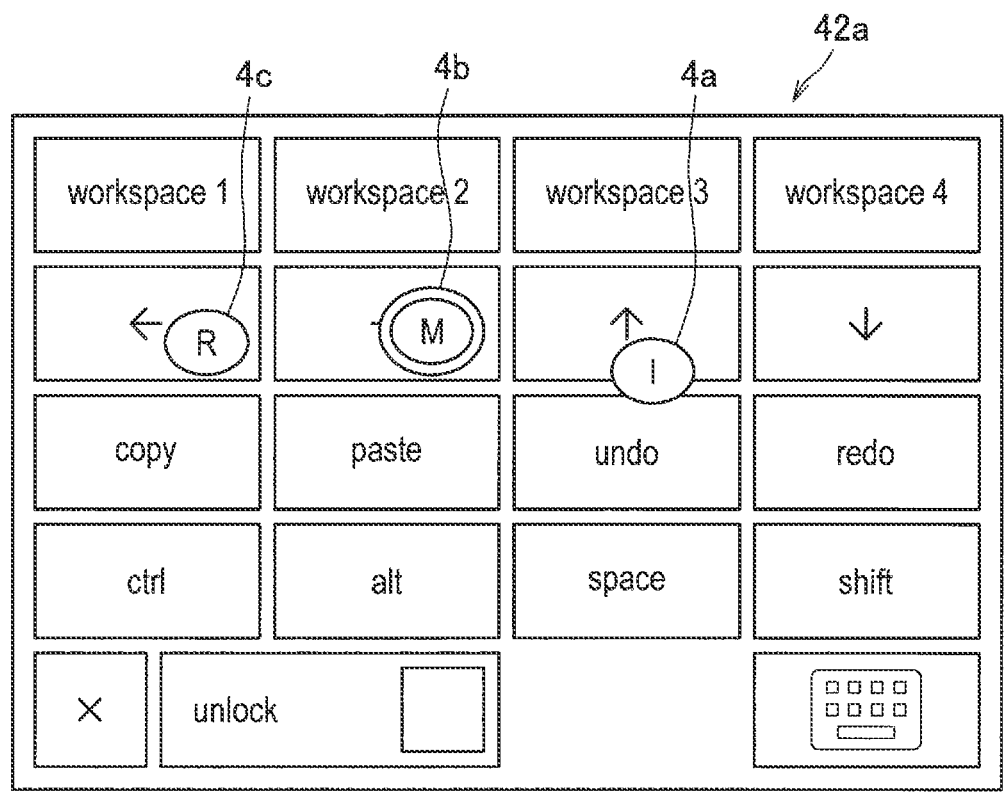
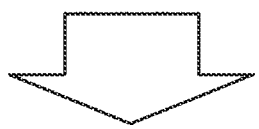
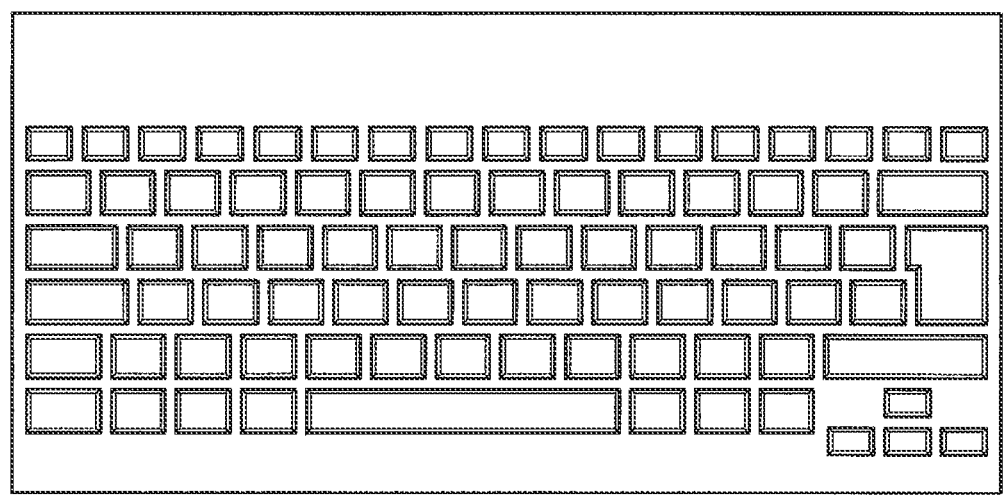

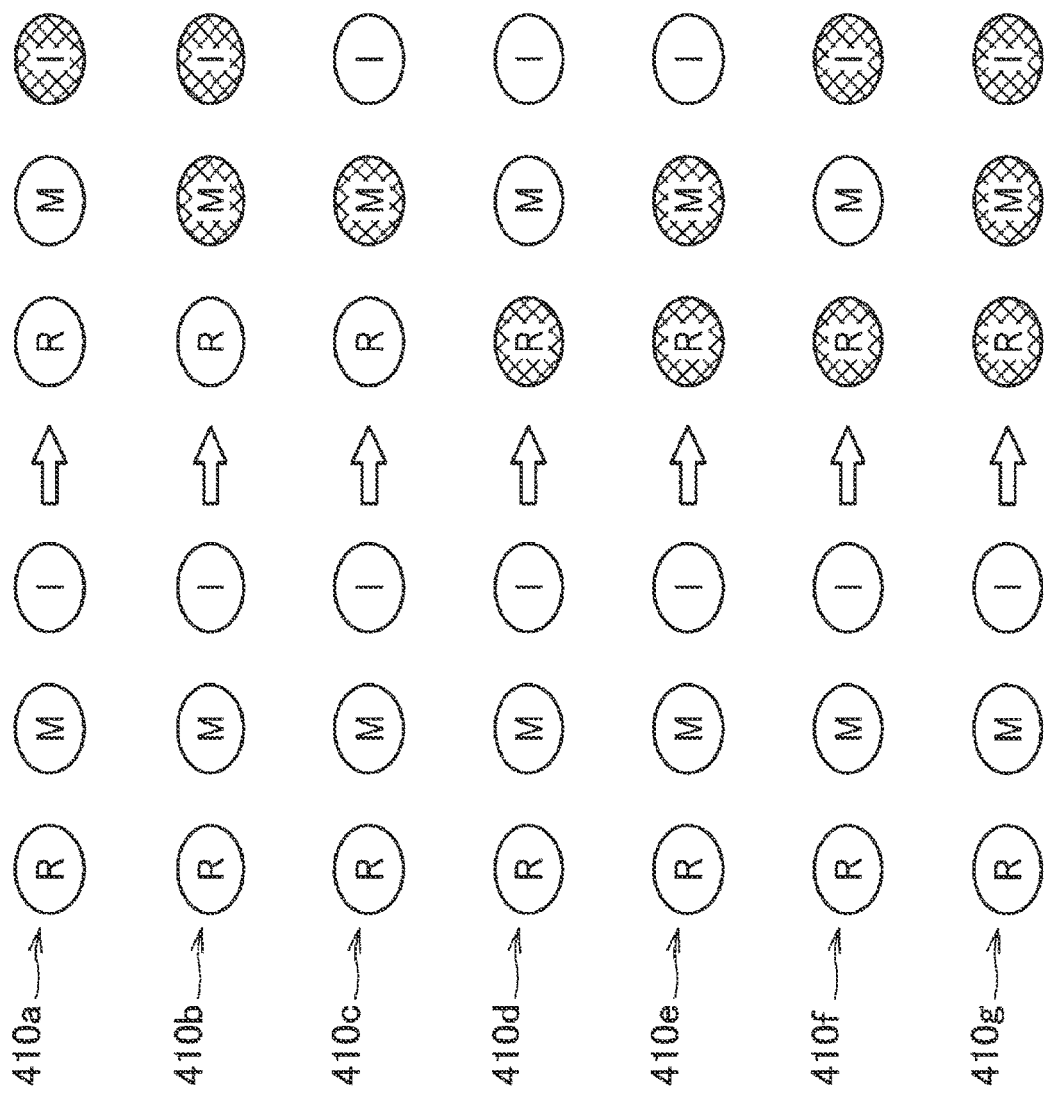
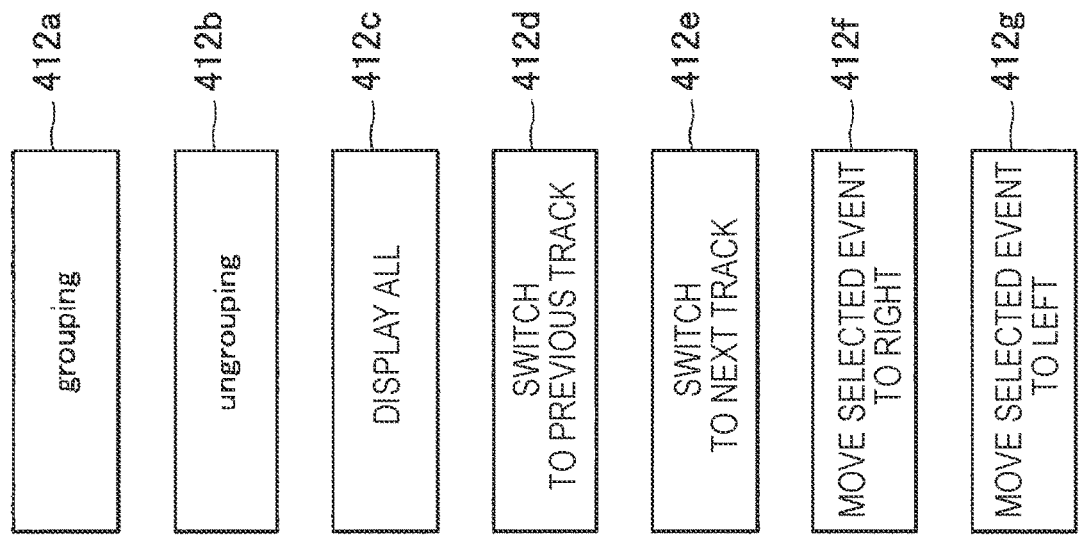
FIG. 17

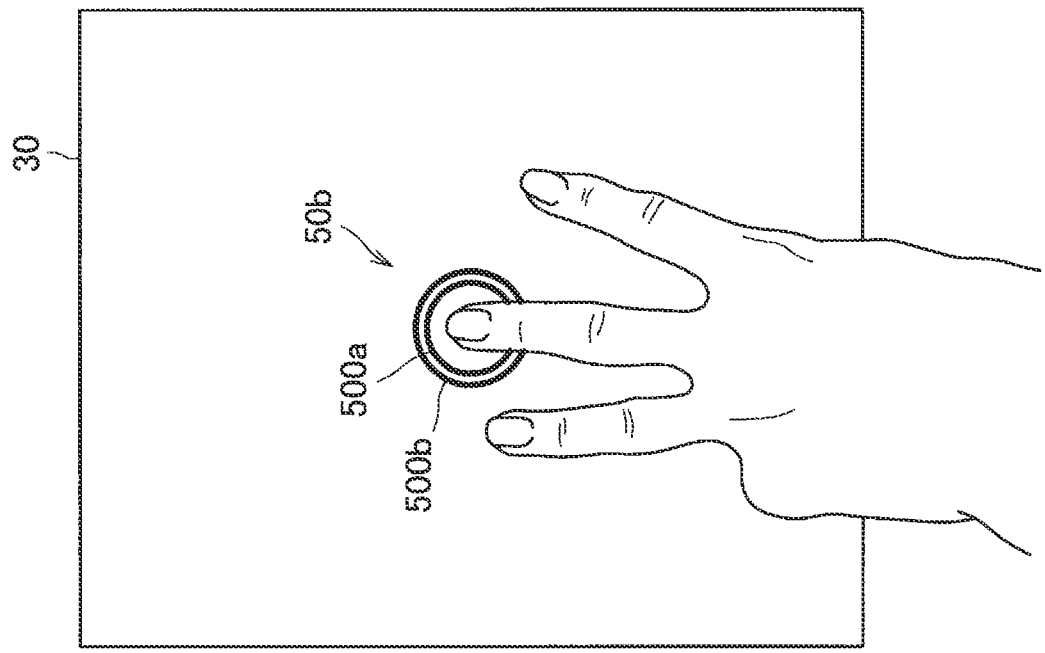
FIG. 23
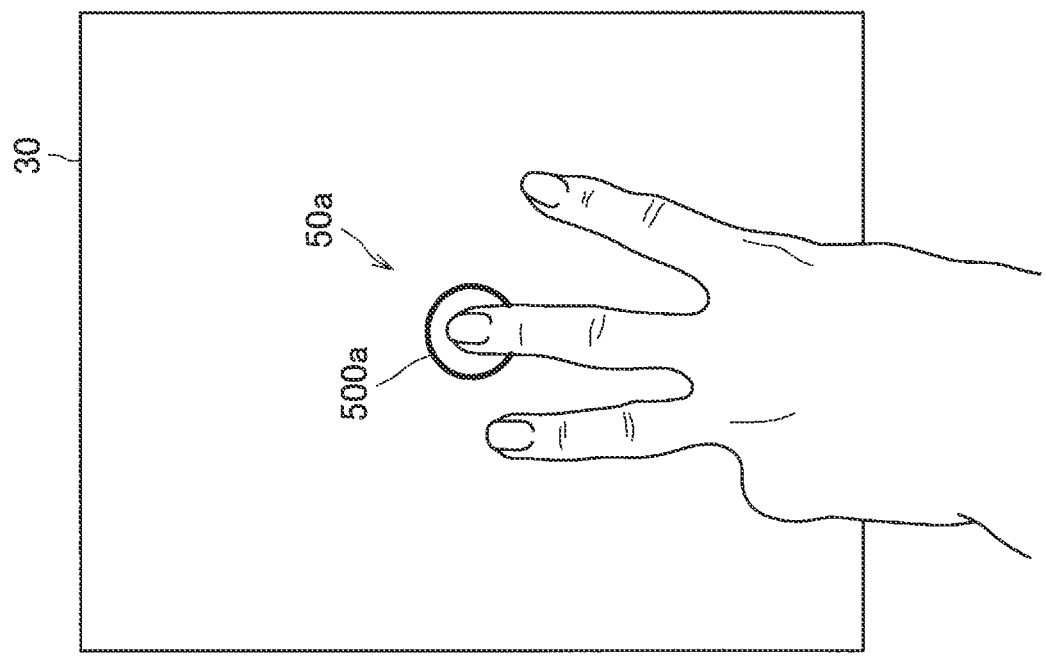

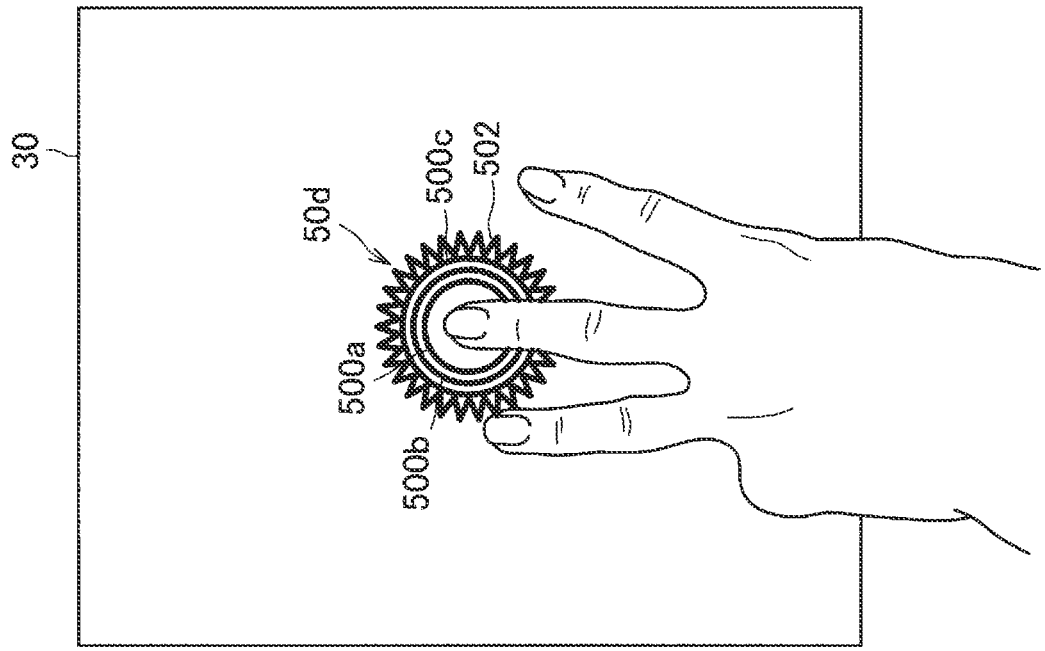
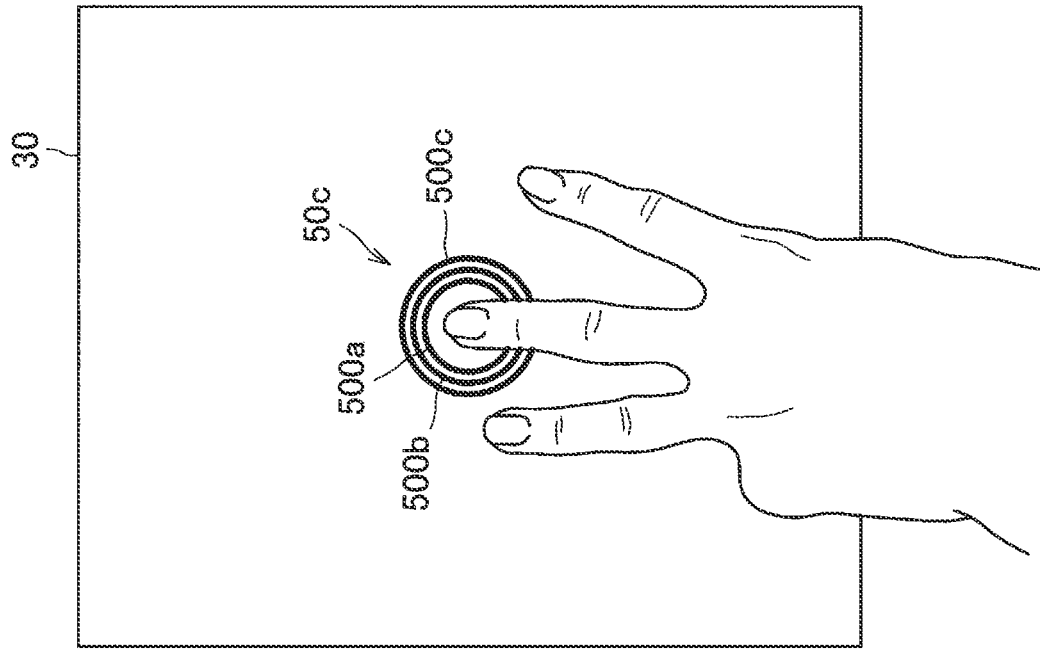
FIG. 24

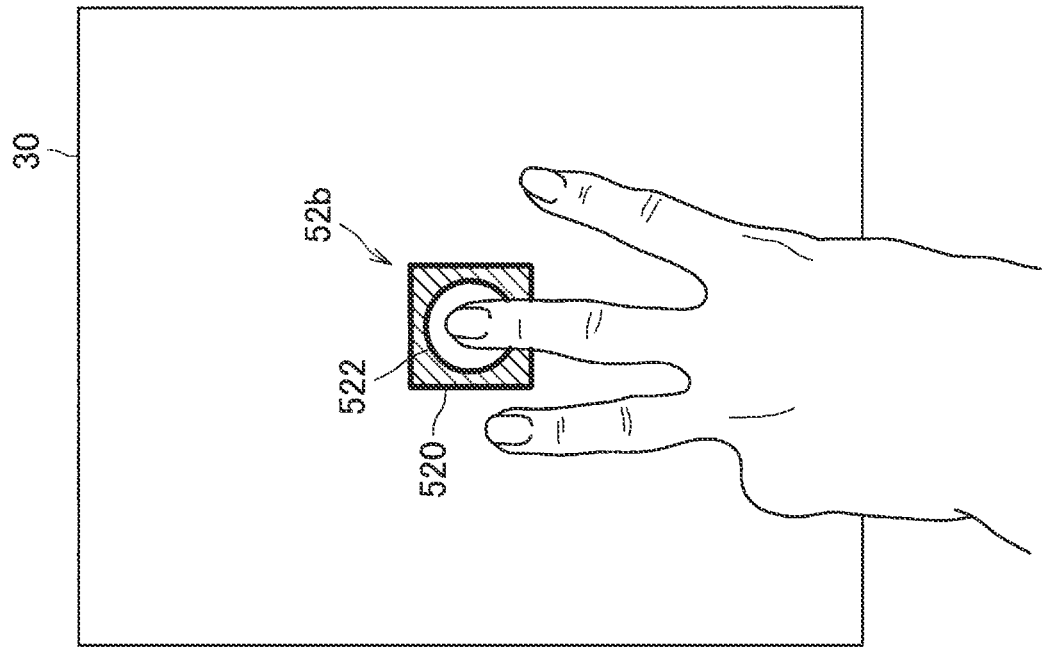
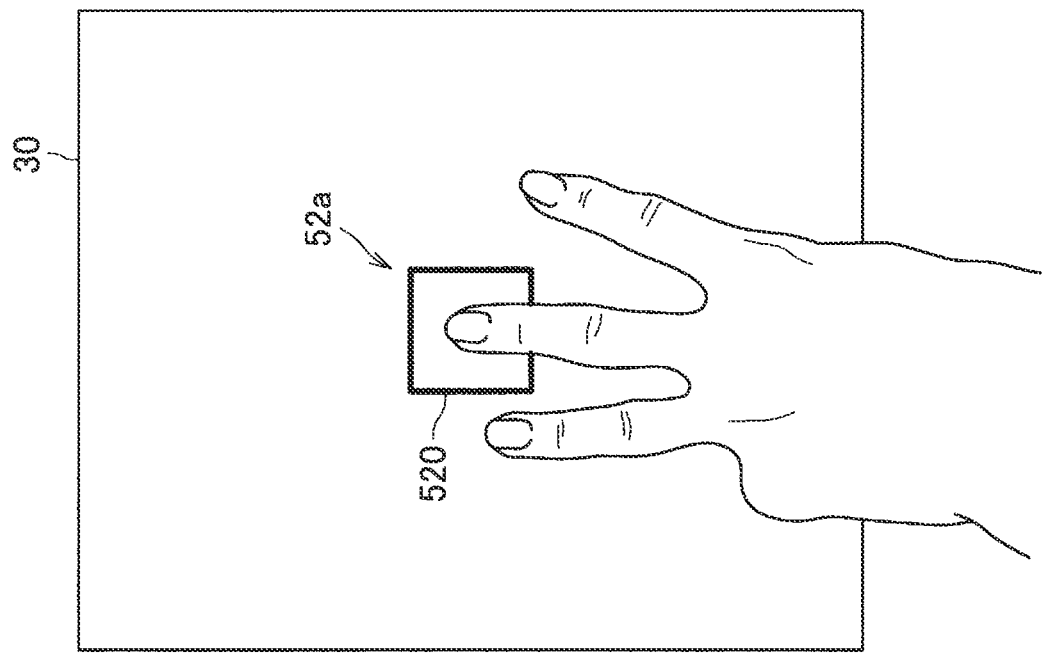
FIG. 25

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/067801 (filed on Jun. 15, 2016) under 35 U.S.C. § 371, which claims priority to Japanese Patent Application No. 2015-184893 (filed on Sep. 18, 2015), which are all hereby incorporated by reference in their entirety.

TECHNICAL FIELD

The present disclosure relates to an information processing device, an information processing method, and a program.

BACKGROUND ART

In the past, for example, research on graphical user interfaces (GUIs) has been conducted for the purpose of enabling information processing devices such as personal computers (PCs) to operate intuitively. Through such GUIs, for example, a user can select an object such as an icon displayed on a display screen using a pointing device and cause a computer to execute a process corresponding to the selected object.

For example, a technique for enlarging content displayed on a display device at a speed corresponding to a magnitude of touch pressure of the user on an input device is disclosed in Patent Literature 1.

CITATION LIST

Patent Literature

Patent Literature: JP 2009-151505A

DISCLOSURE OF INVENTION

Technical Problem

Meanwhile, if the technique described in Patent Literature 1 is applied in a situation in which the user performs a touch operation on an operation surface using a plurality of fingers, few types of processes can be implemented in the technique disclosed in Patent Literature 1. For example, in the technique disclosed in Patent Literature 1, when a total touch pressure is the same, the same process is executed even when the number of fingers touching or the pressure of each finger is different.

In this regard, the present disclosure proposes an information processing device, an information processing method, and a program which are novel and improved and capable of increasing types of processes that can be implemented by a touch operation using a plurality of fingers.

Solution to Problem

According to the present disclosure, there is provided an information processing device, including: a processing executing unit configured to execute a predetermined process on the basis of a combination of results of detecting touch strengths of a plurality of fingers on an operation surface.

Further, according to the present disclosure, there is provided an information processing method, including: executing, by a processor, a predetermined process on the basis of a combination of results of detecting touch strengths of a plurality of fingers on an operation surface.

Further, according to the present disclosure, there is provided a program causing a computer to function as: a processing executing unit configured to execute a predetermined process on the basis of a combination of results of detecting touch strengths of a plurality of fingers on an operation surface.

Advantageous Effects of Invention

As described above, according to the present disclosure, it is possible to increase types of processes that can be implemented by a touch operation using a plurality of fingers. Note that the effects described here are not necessarily limitative, and may be any one of the effects described in this specification.

BRIEF DESCRIPTION OF DRAWINGS

FIG. 4 is an explanatory diagram illustrating an example of a touch gesture for switching a shortcut screen.

FIG. 5 is an explanatory diagram illustrating a display example of another shortcut screen displayed after the touch gesture illustrated in FIG. 4.

FIG. 7 is an explanatory diagram illustrating another example of the touch gesture for switching the shortcut screen.

FIG. 8 is an explanatory diagram illustrating another example of the touch gesture for switching the shortcut screen.

FIG. 9 is an explanatory diagram illustrating another example of the touch gesture for switching the shortcut screen.

FIG. 10 is an explanatory diagram illustrating another example of the touch gesture for switching the shortcut screen.

FIG. 11 is an explanatory diagram illustrating another example of the touch gesture for switching the shortcut screen.

FIG. 12 is an explanatory diagram illustrating another example of the touch gesture for switching the shortcut screen.

FIG. 13 is an explanatory diagram illustrating another example of the touch gesture for switching the shortcut screen.

FIG. 14 is an explanatory diagram illustrating an example of a touch gesture for displaying a specific screen.

FIG. 15 is an explanatory diagram illustrating another example of the touch gesture for displaying the specific screen.

FIG. 17 is an explanatory diagram illustrating another example of a correspondence relation between the touch gesture and the shortcut function.

FIG. 23 is an explanatory diagram illustrating a display example of a feedback display indicating a touch force strength.

FIG. 24 is an explanatory diagram illustrating a display example of a feedback display indicating a touch force strength.

FIG. 25 is an explanatory diagram illustrating another display example of the feedback display illustrating the touch force strength.

MODE(S) FOR CARRYING OUT THE INVENTION

Figure 1:
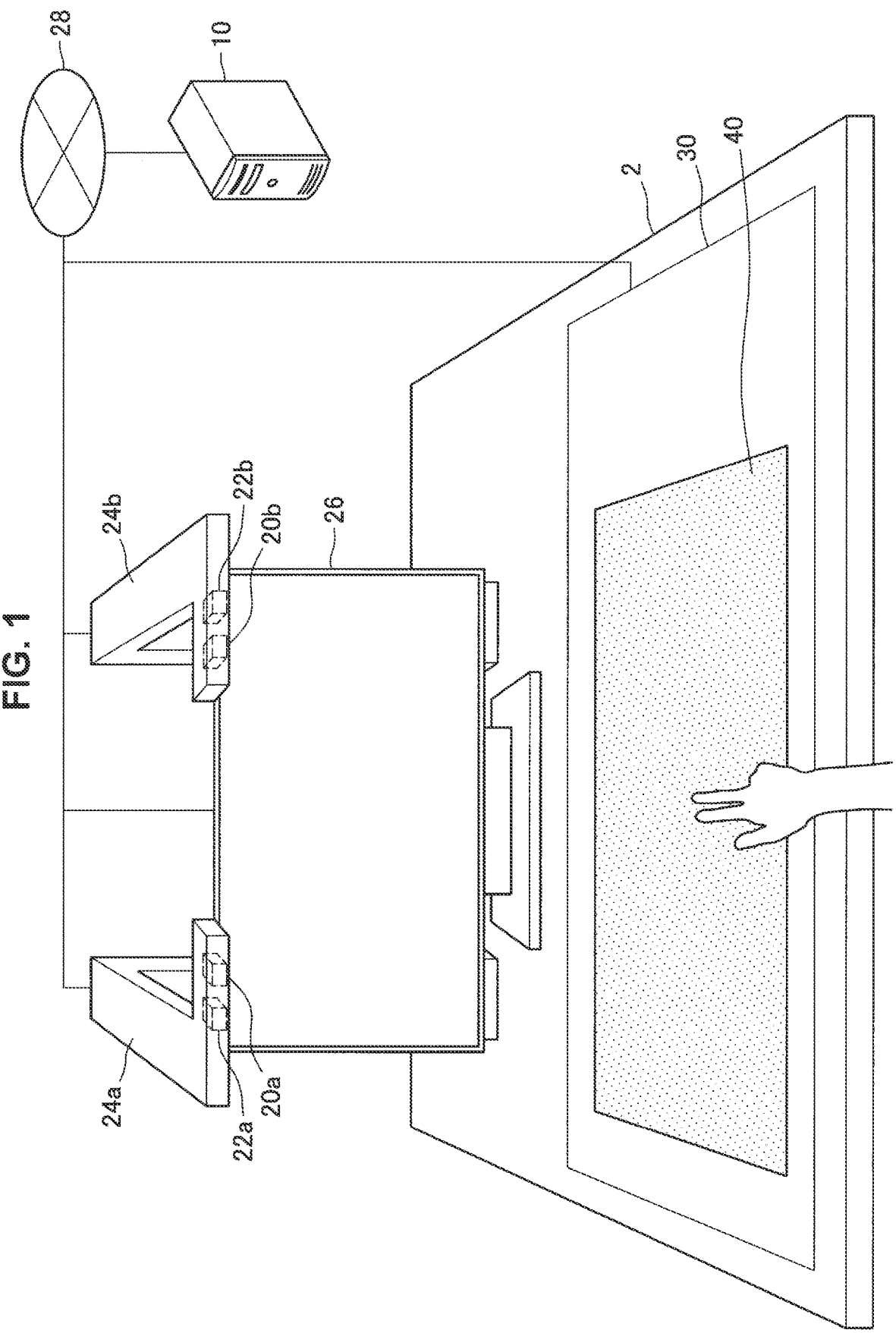
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the drawings, a plurality of components having substantially the same functional configuration may be distinguished by adding different letters after the same reference numeral. For example, a plurality of components having substantially the same functional configuration are distinguished, as in a display unit 20a and a display unit 20b, as necessary. However, when it is not necessary to particularly distinguish a plurality of components having substantially the same functional configuration from each other, only the same reference numeral is added. For example, if it is not necessary to particularly distinguish a display unit 20a and a display unit 20b from each other, it is referred to simply as a display unit 20.

Further, "modes for carrying out the invention" will be described in accordance with the order of sections mentioned below:
1. Basic Configuration of Information Processing System
2. Detailed Description of Embodiments
3. Hardware Configuration
4. Modified Examples 《1. Basic Configuration of Information Processing System》
<1-1. Basic Configuration>

The present disclosure can be implemented in a variety of forms as will be described in detail in "2. Detailed description of embodiments" as an example. First, a basic configuration of an information processing system according to the present embodiment will he described with reference to FIG. 1.

As illustrated in FIG. 1, the information processing system according to the present embodiment includes a server 10, a display unit 20, a camera 22, a display device 26, and an operation surface 30.

[1-1-1. Server 10]

The server 10 is an example of the information processing device in the present disclosure. For example, the server 10 is a device that controls operations of the display unit 20, the camera 22, the display device 26, and the operation surface 30.

Further, the server 10 can perform transmission and reception of information with the display unit 20, the camera 22, the display device 26, and the operation surface 30 via a communication network 28 to be described later.

[1-1-2. Display Unit 20]

The display unit 20 is a device that displays, for example, image information received from the server 10. For example, as illustrated in FIG. 1, the display unit 20 is a projector installed in an arm section 24, and the display unit 20 projects image information 40 onto the operation surface 30. The arm section 24 may be arranged on a desk 2 independently of the display device 26 to be described later or may be connected with the display device 26.

Further, the display unit 20 can change a display (projection) direction in accordance with a control signal received from the server 10.

[1-1-3. Camera 22]

The camera 22 detects an external video, for example, using an imaging element such as a charge coupled device (CCD) or a complementary metal oxide semiconductor (CMOS) or an infrared sensor through a lens and records the external video as a digital image.

The camera 22 is installed in, for example, the arm section 24 and captures a video on the operation surface 30.

[1-1-4. Operation Surface 30]

The operation surface 30 is a surface on which the user performs a touch operation. For example, the operation surface 30 is able to detect a position touched by the user in a coordinate system defined on the operation surface 30 and a touch force strength. For example, the operation surface 30 detects the touch force strength as values of a plurality of steps.

Further, the operation surface 30 is also able to transmit the detected information to the server 10 via, the communication network 28 through wired communication or wireless communication.

The operation surface 30 is, for example, a pressure-sensitive sheet arranged on the desk 2. However, the present disclosure is not limited to this example, and the operation surface 30 may be a sheet in which a pressure-sensitive sheet and a capacitance sensor are stacked in a layer form, a pressure-sensitive touch pad, or a panel in which a pressure-sensitive sensor and a capacitive touch panel are combined. For example, the operation surface 30 may be a touch display. FIG. 1 illustrates the example in which the operation surface 30 is independent from the desk 2, but the present disclosure is not limited to this example, and the operation surface 30 may be formed integrally with the desk 2.

[1-1-5. Display Device 26]

The display device 26 is a device including a display such as a liquid crystal display (LCD) or an organic light emitting diode (OLED). For example, the display device 26 is a device whose display is oriented in a horizontal direction such as a monitor for a desktop PC. However, the present disclosure is not limited to this example, and the display device 26 may be a table board type device or a rear projection type display that performs projection from a rear side of a screen through an internal projector.

For example, the display device 26 displays image information such as an application screen received from the server 10.

[1-1-6. Communication Network 28]

The communication network 28 is a wired or wireless transmission path of information transmitted from a device connected to the communication network 28. Examples of the communication network 28 include a public line network such as a telephone network, the Internet, a satellite communication network, various local area networks (LANs) including Ethernet (a registered trademark), and a wide area network (WAN). Further, the communication network 28 may include a dedicated line network such as an Internet protocol-virtual private network (IP-VPN).

The configuration of the information processing system according to the present embodiment is not limited to the above configuration. For example, the display unit 20 and the operation surface 30 may be integrally configured as in a touch display. FIG. 1 illustrates the example in which the display unit 20 and the camera 22 are installed on the arm section 24 together, but the present disclosure is not limited to this example, and the display unit 20 and the camera 22 may be arranged on the desk 2 in an independent state. Further, FIG. 1 illustrates the example in which two display units 20 and two cameras 22 are installed on the arm section 24, but the present disclosure is not limited thereto. Only one display unit 20 or camera 22 may be installed, or three or more display units 20 or cameras 22 may be installed. Further, the information processing system may not include the display device 26.

<1-2. Description of Problems>

The configuration of the information processing system according to the present embodiment has been described above. Meanwhile, products including only a touch panel with no input device such as a mouse or a keyboard have been widespread since the past. In such products, for example, shortcuts are often performed with a touch gesture.

However, in the known technique, touch gestures are allocated one by one in association with only a result of detecting the number of fingers or a motion of the fingers. For this reason, in the known techniques, the number of types of shortcuts that can be implemented with touch gestures is small.

As a method of solving the above problem, a method of implementing shortcuts using hardware buttons is considered. However, in this method, since it is necessary to press a hardware button, operation efficiency for the user decreases, or the hardware scale is increased.

In this regard, the server 10 according to the present embodiment was created in light of the foregoing. According to the present embodiment, it is possible to increase types of touch gestures which are uniquely identified using a combination of results of detecting touch strengths of individual fingers in addition to a result of detecting the number of fingers touching the operation surface 30 or a motion of the fingers. As a result, it is possible to increase the number of types of processes that can be implemented with touch gestures.

«2. Detailed Description of Embodiment»

<2-1. Configuration>

Figure 2:
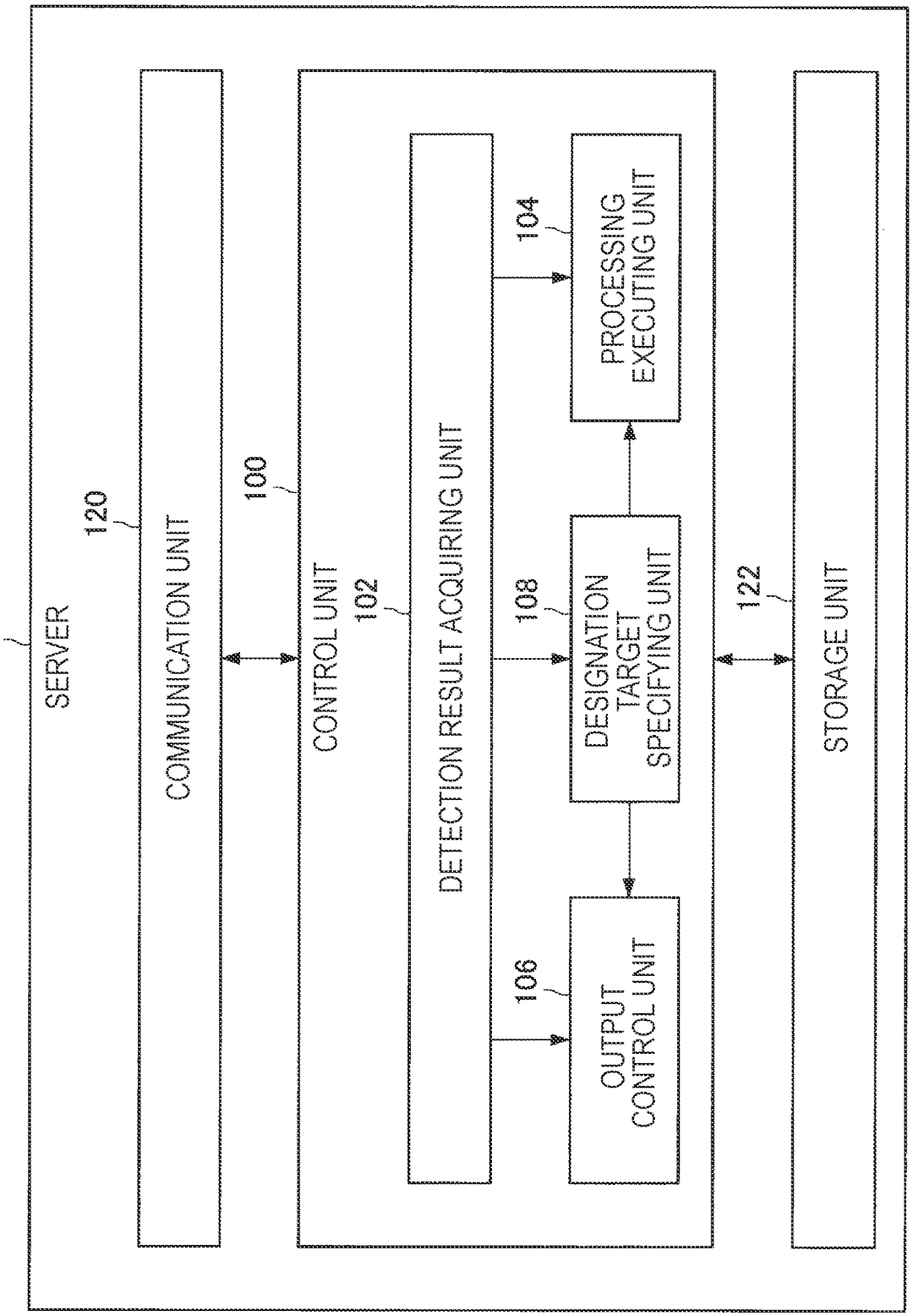
FIG. 2 is a functional block diagram illustrating a configuration example of a server 10 according to the embodiment.

Next, a configuration of the server 10 according to the present embodiment will be described in detail. FIG. 2 is a functional block diagram illustrating the configuration of the server 10 according to the present embodiment. As illustrated in FIG. 2, the server 10 includes a control unit 100, a communication unit 120, and a storage unit 122.

[2-1-1. Control Unit 100]

The control unit 100 controls the operation of the server 10 in general using hardware such as a central processing unit (CPU) 150 and a random access memory (RAM) 154 (to be described later) which are installed in the server 10. Further, as illustrated in FIG. 2, the control unit 100 includes a detection result acquiring unit 102, a processing executing unit 104, an output control unit 106, and a designation target specifying unit 108.

[2-1-2. Detection Result Acquiring Unit 102]

The detection result acquiring unit 102 acquires a result of detecting a plurality of fingers touching the operation surface 30. For example, the detection result acquiring unit 102 acquires the detection result such as a touch position, a touch force strength, and a motion of each of a plurality of fingers of the user detected by the operation surface 30 from the operation surface 30. Here, the motion of the finger includes, for example, a tap.

Alternatively, the detection result acquiring unit 102 is also able to identify touch states of a plurality of fingers on the operation surface 30 by analyzing an image captured by the camera 22. For example, the detection result acquiring unit 102 specifies touch positions or motions of fingers of the user on the operation surface 30 on the basis of the result of analyzing the captured image. Further, the detection result acquiring unit 102 specifies a touch force strength of each of a plurality of fingers on the operation surface 30, for example, by performing image recognition on the deflection of the operation surface 30 being photographed.

[2-1-3. Processing Executing Unit 104]

The processing executing unit 104 executes a predetermined process on the basis of a result of detecting the touches of a plurality of fingers acquired by the detection result acquiring unit 102. For example, the processing executing unit 104 executes a predetermined process on the basis of a combination of acquired results of detecting the touch strengths of a plurality of fingers. Alternatively, the processing executing unit 104 executes a predetermined process on the basis of a change in an acquired result of detecting contact states of a first finger and a second finger. The touch strength is, for example, a touch force strength. However, the present disclosure is not limited to this example, and the touch strength may be a touch speed of a finger on the operation surface 30.

More specifically, the processing executing unit 104 first acquires process identification information stored in the storage unit 122 in association with the result of detecting touches of a plurality of fingers acquired by the detection result acquiring unit 102, and executes a process indicated by the acquired process identification information. As an example, when the acquired process identification information is display control information for switching an operation screen being displayed to another type of operation screen, the processing executing unit 104 causes the display unit 20 to update the operation screen being displayed on the operation surface 30 on the basis of the acquired display control information.

(2-1-3-1. Switching of Shortcut Screen)

For example, the processing executing unit 104 switches the shortcut screen being displayed on the operation surface 30 on the basis of the result of detecting the touches of a plurality of fingers acquired by the detection result acquiring unit 102. Here, the above-mentioned functions will be described in further detail with reference to FIGS. 3 to 15. A method of switching a shortcut screen back and forth with a touch gesture will be described below The following description will proceed with an example in which the user performs the touch gesture with the left hand, but the present disclosure is not limited to this example, and the present disclosure is applicable substantially similarly when the touch gesture is performed with the right hand. Further, in the following description, three or more shortcut screens are assumed to be provided in advance.

Touch Gesture 1

Figure 3:
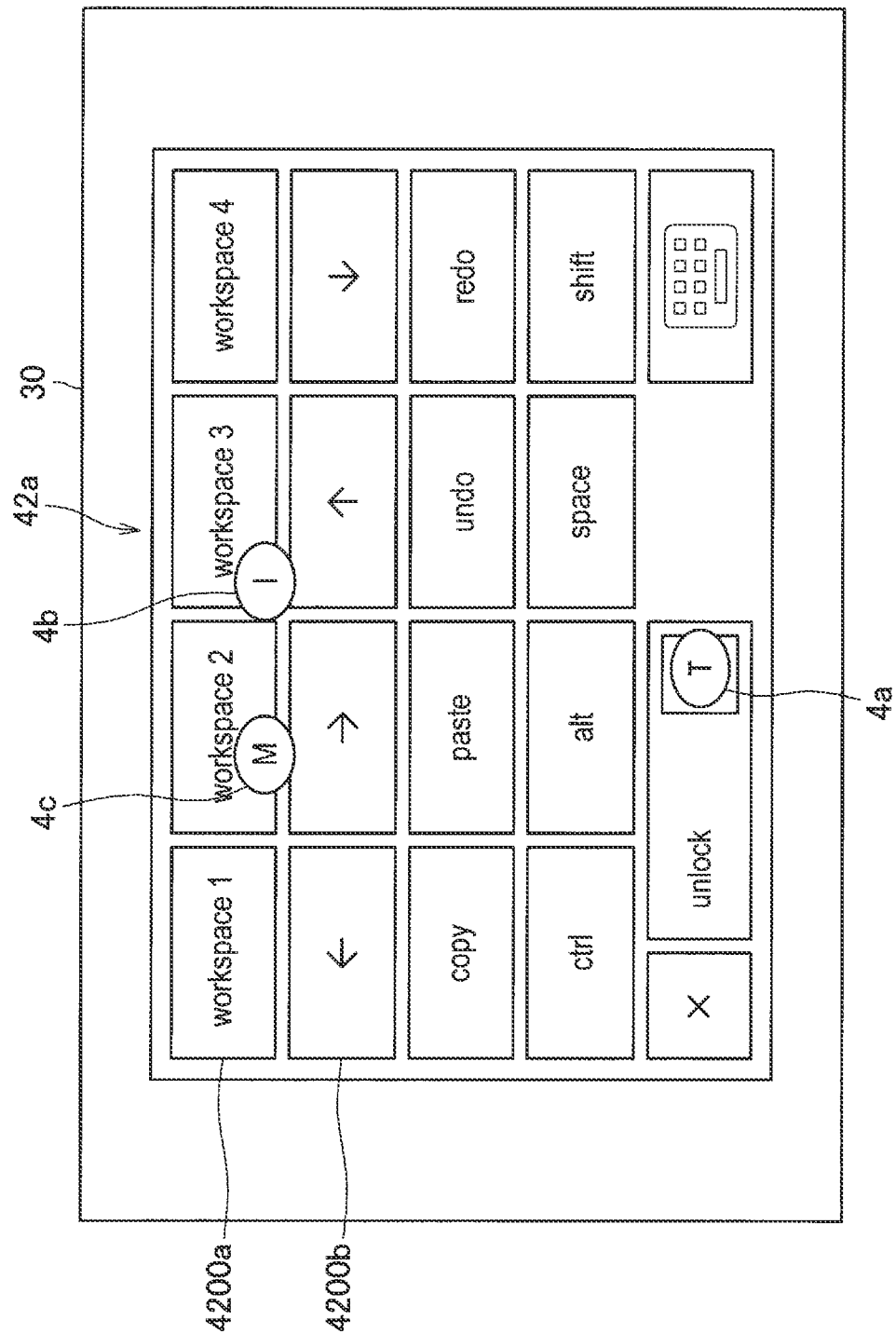
FIG. 3 is an explanatory diagram illustrating an example of a touch operation for activating a shortcut screen according to the embodiment.

First, an example of a method of sliding a finger in a touch state among methods of switching the shortcut screen back and forth with the touch gesture will be described with reference to FIGS. 3 to 5. As illustrated in FIG. 3, first, when three fingers including, for example, a thumb 4a, an index finger 4b, and a middle finger 4c touch the operation surface 30 at substantially the same time, the processing executing unit 104 causes an initial shortcut screen 42a serving as an initially displayed shortcut screen to be displayed on the operation surface 30. In FIG. 3, the thumb 4a is indicated by "T," the index finger 4b is indicated by "I," and the middle finger 4c is indicated by "M."

As illustrated in FIG. 3, the initial shortcut screen 42a includes a plurality of function selection buttons 4200 used when the user selects a function to be used. When it is detected that all three fingers in the touch state are separated from the operation surface 30, and any one function selection button 4200 is touched on the operation surface 30 while the initial shortcut screen 42a is being displayed, the processing executing unit 104 executes a function corresponding to the touched function selection button 4200.

Further, for example, when it is detected that the index finger 4b and the middle finger 4c slidingly rotate around the thumb 4a in a leftward direction on the operation surface 30 in a state in which the thumb 4a is touching while the initial shortcut screen 42a is being displayed as indicated by arrows in (A) of FIG. 4, the processing executing unit 104 causes a shortcut screen 42b which is a first previous shortcut screen prior to the initial shortcut screen 42a to be displayed on the operation surface 30 as illustrated in (A) of FIG. 5. Further, when it is detected that the index finger 4b and the middle finger 4c slidingly rotate around the thumb 4a in a rightward direction on the operation surface 30 as indicated by arrows in (B) of FIG. 4, the processing executing unit 104 causes a shortcut screen 42c which is a first subsequent shortcut screen subsequent to the initial shortcut screen 42a to be displayed on the operation surface 30 as illustrated in (B) of FIG. 5.

Further, when it is detected that, while the shortcut screen 42b or the shortcut screen 42c illustrated in FIG. 5 is being displayed, in a state in which the thumb 4a is touching, the index finger 4b and the middle finger 4c are first separated from the operation surface 30, then touch the operation surface 30 again, and then slidingly rotate in the same direction as the last time, the processing executing unit 104 causes a first previous shortcut screen (not illustrated) or a first subsequent shortcut screen (not illustrated) to be displayed on the operation surface 30.

Touch Gesture 2

Figure 6:
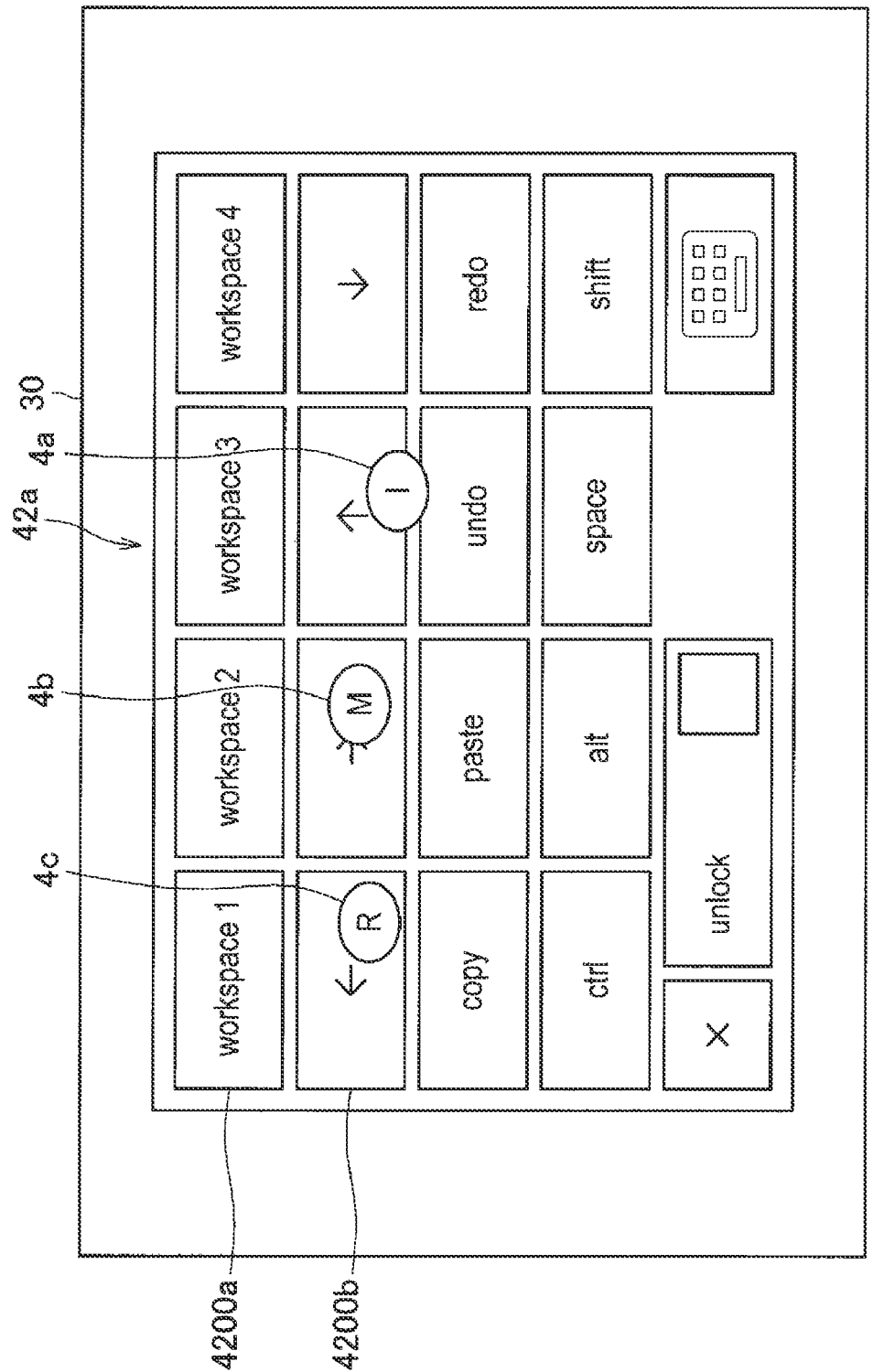
FIG. 6 is an explanatory diagram illustrating another example of the touch operation for activating the shortcut screen according to the embodiment.

Next, an example of a method using a change in the touch force among methods of switching the shortcut screen back and forth with the touch gesture will be described with reference to FIGS. 6 and 7. As illustrated in FIG. 6, first, when three fingers including, for example, an index finger 4a, a middle finger 4b, and a ring finger 4c touch the operation surface 30 at the same time, the processing executing unit 104 causes an initial shortcut screen 42a to be displayed on the operation surface 30 (similarly to FIG. 3). In FIG. 6, the index finger 4a is indicated by "I," the middle finger 4b is indicated by "M," and the ring finger 4c is indicated by "R."

Then, for example, when it is detected that, in a state in which the three fingers are touching, the touch force of the ring finger 4c is increased to a first threshold value or more as indicated by shading in (A) of FIG. 7, the processing executing unit 104 causes the first previous shortcut screen 42b illustrated in (A) of FIG. 5 to be displayed on the operation surface 30. Further, when it is detected that the touch force of the index finger 4a is increased to the first threshold value or more as indicated by shading in (B) of FIG. 7, the processing executing unit 104 causes the first subsequent shortcut screen 42c illustrated in (B) of FIG. 5 to be displayed on the operation surface 30. The first threshold value is set to a value that is a predetermined value equal to or higher than a normal touch force strength. Further, the touch force strength is assumed to be detected basically in two or more steps, and the touch force strength is assumed to increase as a step number increases. In the following description, a strength of force that is the first threshold value or more and a second threshold value or less is referred to as a "first step strength."

Further, in a state in which the three fingers are touching while the shortcut screen 42b is being displayed, when the touch force of the ring finger 4c is decreased and then increased to the first step strength again, the processing executing unit 104 causes a previous shortcut screen (the second previous shortcut screen from the initial shortcut screen) to be displayed on the operation surface 30. Similarly, when the shortcut screen 42c is being displayed, if the touch force of the index finger 4a is decreased and then increased to the first step strength again, the processing executing unit 104 causes a subsequent shortcut screen (the second subsequent shortcut screen from the initial shortcut screen) to be displayed on the operation surface 30.

Touch Gesture 3

Next, another example of a method using a change in the touch force among methods of switching the shortcut screen back and forth with the touch gesture will be described with reference to FIG. 6. In the following description, the initial shortcut screen 42a is assumed to be displayed on the operation surface 30 when three fingers touch the operation surface 30 as illustrated in FIG. 6.

For example, in a state in which three fingers are touching, when it is detected that the touch forces of the middle finger 4b and the ring finger 4c are increased to the first step strength at substantially the same time as indicated by shading in (A) of FIG. 8, the processing executing unit 104 causes the second previous shortcut screens to be displayed on the operation surface 30. Further, when it is detected that the forces of the index finger 4a and the middle finger 4b are increased to the first step strength at substantially the same time as indicated by shading in (B) of FIG. 8, the processing executing unit 104 causes the second subsequent shortcut screen to be displayed on the operation surface 30.

Further, while the second subsequent shortcut screen is being displayed, when it is detected that the touch forces of the index finger 4a and the middle finger 4b are decreased and then increased to the first step strength again, the processing executing unit 104 causes a shortcut screen which is a second shortcut screen subsequent to the current shortcut screen (a fourth subsequent shortcut screen from the initial shortcut screen) to be displayed on the operation surface 30. Further, when the touch forces of the index finger 4a and the middle finger 4b are decreased and then only the touch force of the index finger 4a is increased to the first step strength, the processing executing unit 104 causes a shortcut screen which is a first shortcut screen subsequent to the current shortcut screen (a third subsequent shortcut screen from the initial shortcut screen) to be displayed on the operation surface 30.

Touch Gesture 4

Next, another example of a method using a change in the touch force among methods of switching the shortcut screen back and forth with the touch gesture will be described with reference to FIG. 9. In the following description, the initial shortcut screen 42a is assumed to be displayed on the operation surface 30 when three fingers touch the operation surface 30 as illustrated in FIG. 6.

For example, in the state in which the three fingers are touching, when it is detected that the touch force of the ring finger 4c is increased to a second step strength as indicated h shading in (A) of FIG. 9 (a type different from that in FIG. 7), the processing executing unit 104 causes the second previous shortcut screen to be displayed on the operation surface 30. Further, in the state in which three fingers are touching, when it is detected that the touch force of the index finger 4a is increased to the second step strength as indicated by shading in (B) of FIG. 9, the processing executing unit 104 causes the second subsequent shortcut screen to be displayed on the operation surface 30.

Further, while second subsequent shortcut screen is being displayed, when the touch force of the index finger 4a is decreased and then increased to the second step strength again, the processing executing unit 104 causes a shortcut screen which is a second shortcut screen from the current shortcut screen (the fourth subsequent shortcut screen from the initial shortcut screen) to be displayed on the operation surface 30. Further, when the touch force of the index finger 4a is decreased and then increased to the first step strength, the processing executing unit 104 causes a shortcut screen which is a first shortcut screen subsequent to the current shortcut screen (the third subsequent shortcut screen from the initial shortcut screen) to be displayed on the operation surface 30.

Touch Gesture 5

Next, an example of a method using the number of taps of a finger among methods of switching the shortcut screen back and forth with the touch gesture will be described with reference to FIG. 10. In the following description, the initial shortcut screen 42a is assumed to be displayed on the operation surface 30 when three fingers touch the operation surface 30 as illustrated in FIG. 6.

For example, when it is detected that a single tap is performed by the ring finger 4c in the state in which the index finger 4a and the middle finger 4b are touching as indicated by a double circle in (A) of FIG. 10, the processing executing unit 104 causes the first previous shortcut screen 42b illustrated in, for example, (A) of FIG. 5 to be displayed on the operation surface 30. Further, in the state in which the middle finger 4b and the ring finger 4c are touching, when it is detected that a single tap is performed by the index finger 4a as indicated by a double circle in (B) of FIG. 10, the processing executing unit 104 causes the first subsequent shortcut screen 42c as illustrated in, for example, (B) of FIG. 5 to be displayed on the operation surface 30.

Further, when it is detected that a single tap is performed by the index finger 4a again while the shortcut screen 42c is being displayed, the processing executing unit 104 causes a shortcut screen which is a first subsequent shortcut screen from the current shortcut screen to be displayed on the operation surface 30.

Touch Gesture 6

Next, another example of a method using the number of taps of a finger among methods of switching the shortcut screen back and forth with the touch gesture will be described with reference to FIG. 11. In the following description, the initial shortcut screen 42a is assumed to be displayed on the operation surface 30 when three fingers touch the operation surface 30 as illustrated in FIG. 6.

For example, when it is detected that a single tap is performed by the middle finger 4b and the ring finger 4c at substantially the same time in the state in which the index finger 4a is touching as indicated by two double circles in (A) of FIG. 11, the processing executing unit 104 causes the second previous shortcut screen to be displayed on the operation surface 30. Further, when it is detected that a single tap is performed by the index finger 4a and the middle finger 4b at substantially the same time as indicated by two double circles in (B) of FIG. 11, the processing executing unit 104 causes the second subsequent shortcut screen to be displayed on the operation surface 30.

Further, while the second subsequent shortcut screen is being displayed, when it is detected that a single tap is performed by the index finger 4a and the middle finger 4b again substantially at the same time, the processing executing unit 104 causes a shortcut screen which is a second shortcut screen subsequent to the current shortcut screen (the fourth subsequent shortcut screen from the initial shortcut screen) to be displayed on the operation surface 30. Further, while the second subsequent shortcut screen is being displayed, when it is detected that a single tap is performed by only the index finger 4a, the processing executing unit 104 causes a shortcut screen which is a first shortcut screen subsequent to the current shortcut screen (the third subsequent shortcut screen from the initial shortcut screen) to be displayed on the operation surface 30.

Touch Gesture 7

Next, another example of a method using the number of taps of a finger among methods of switching the shortcut screen back and forth with the touch gesture will be described with reference to FIG. 11. In the following description, the initial shortcut screen 42a is assumed to be displayed on the operation surface 30 when three fingers touch the operation surface 30 as illustrated in FIG. 6.

For example, when it is detected that a double tap is performed by the ring finger 4c (that is, a second tap is performed within a predetermined time after a first tap is performed) in the state in which the index finger 4a and the middle finger 4b are touching as indicated by a triple circle in (A) of FIG. 12, the processing executing unit 104 causes the second previous shortcut screen to be displayed on the operation surface 30. Further, when it is detected that a double tap is performed by the index finger 4a in the state in which and the middle finger 4b and the ring finger 4c are touching as indicated by a triple circle in (B) of FIG. 12, the processing executing unit 104 causes the second subsequent shortcut screen to be displayed on the operation surface 30.

Further, while the second subsequent shortcut screen is being displayed, when it is detected that a double tap is performed by the index finger 4a again, the processing executing unit 104 causes a shortcut screen which is a second shortcut screen subsequent to the current shortcut screen (the fourth subsequent shortcut screen from the initial shortcut screen) to be displayed on the operation surface 30. Further, while the second subsequent shortcut screen is being displayed, when it is detected that only a single tap is performed by the index finger 4a, the processing executing unit 104 causes a shortcut screen which is a first shortcut screen subsequent to the current shortcut screen (the third subsequent shortcut screen from the initial shortcut screen) to be displayed on the operation surface 30.

Touch Gesture 8

Next, an example of a method using an order of tapping fingers among methods of switching the shortcut screen back and forth with the touch gesture will be described with reference to FIG. 13. In the following description, the initial shortcut screen 42a is assumed to be displayed on the operation surface 30 when three fingers touch the operation surface 30 as illustrated in FIG. 6.

For example, in the state in which the index finger 4a is touching, when a single tap is performed by the middle finger 4b and then a single tap is performed by the ring finger 4c (that is, a single tap of the ring finger 4c is performed within a predetermined time after a single tap of the middle finger 4b is performed) as indicated by two double circles having different shadings in (A) of FIG. 13, the processing executing unit 104 causes the first previous shortcut screen 42b illustrated in, for example, (A) of FIG. 5 to be displayed on the operation surface 30. For example, in the state in which the ring finger 4c is touching, when a single tap is performed by the middle finger 4b and then a single tap is performed by the index finger 4a as indicated by two double circles having different shadings in (B) of FIG. 13, the processing executing unit 104 causes the first subsequent shortcut screen 42c illustrated in, for example, (B) of FIG. 5 to be displayed on the operation surface 30.

Further, when it is detected that single taps are performed by the middle finger 4b and the index finger 4a subsequently again while the shortcut screen 42c is being displayed, the processing executing unit 104 causes a shortcut screen which is a first shortcut screen subsequent to the current shortcut screen to be displayed on the operation surface 30.

Touch Gesture 9

Next, an example of a method of switching to a specific screen with the touch gesture will be described with reference to FIG. 14 and FIG. 15. In the following description, the initial shortcut screen 42a is assumed to be displayed on the operation surface 30 when three fingers touch the operation surface 30 as illustrated in FIG. 6.

For example, in a state in which three fingers are touching, when it is detected that the touch forces of the three fingers are increased to the first step strength at substantially the same time as indicated by shading in FIG. 14, the processing executing unit 104 causes a specific screen such as a software keyboard screen 44 illustrated in, for example, FIG. 14 to be displayed on the operation surface 30.

Alternatively, for example, in a state in which the index finger 4a and the ring finger 4c are touching, when it is detected that a single tap is performed by the middle finger 4b h (which is a representative finger) as indicated by double circles in FIG. 15, the processing executing unit 104 causes a specific screen such as a software keyboard screen 44 to be displayed on the operation surface 30.

The above-described methods (the touch gestures 1 to 9) are not limited to an example in which they are applied independently, and a plurality of methods may be combined. Further, the number of fingers used for an operation is not limited to three and may be four, five, or two.

(2-1-3-2. Execution of Shortcut Function)

The processing executing unit 104 is also able to execute the shortcut function associated with the result of detecting touches of a plurality of fingers acquired by the detection result acquiring unit 102. Here, this function will be described in further detail with reference to FIGS. 16 to 20. The following description will proceed with an example in which the user performs the touch gesture with the left hand, but the present disclosure is not limited to this example, and the present disclosure is applicable substantially similarly when the touch gesture is performed with the right hand.

Correspondence Relation Example 1

Figure 16:
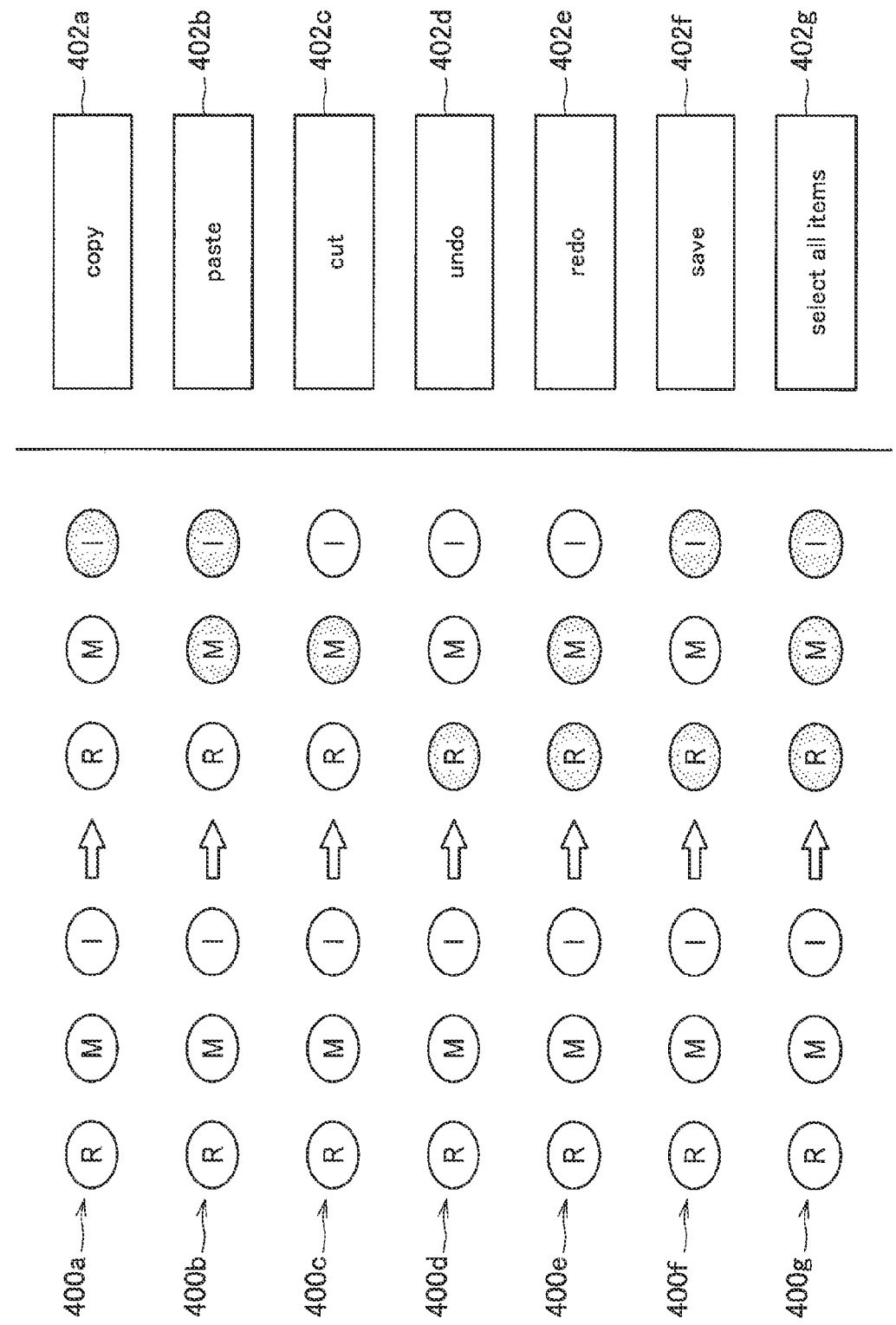
FIG. 16 is an explanatory diagram illustrating an example of a correspondence relation between a touch gesture and a shortcut function.

First, an example of a method using a change in a touch force among methods of executing a shortcut function through a touch gesture will be described with reference to FIG. 16. FIG. 16 is an explanatory diagram illustrating a correspondence relation between a touch gesture 400 in which the touch force is changed to the first step strength and a shortcut function 402. In FIG. 16, the index finger is indicated by "I," the middle finger is indicated by "M," and the ring finger is indicated by "R." Further, in all the touch gestures 400 illustrated in FIG. 16, it is assumed that three fingers including the index finger, the middle finger, and the ring finger initially touch the operation surface 30.

For example, in a touch gesture 400a illustrated in FIG. 16, when it is detected that only the touch force of the index finger is increased to the first step strength in a state in which the three fingers are touching as indicated by shading, the processing executing unit 104 executes a "copy" function 402a which is previously associated with the touch gesture 400a.

Similarly, when touch gestures 400b to 400g illustrated in FIG. 16 are detected, the processing executing unit 104 executes the associated shortcut functions 402b to 402g. As illustrated in FIG. 16, a maximum of 7 ($=2^3-1$) correspondence relations can be set as illustrated in FIG. 16 since the number of fingers is 3, and the number of steps to be distinguished is 1.

For example, for the shortcut functions such as "copy," "cut," "select," the processing executing unit 104 sets an object or a selection range which is specified by the designation target specifying unit 108 and designated by the user as an execution target, and then executes a corresponding shortcut function.

Correspondence Relation Example 2

Next, another example of a method using a change in a touch force among methods of executing a shortcut function through a touch gesture will be described with reference to FIG. 17. FIG. 17 is an explanatory diagram illustrating a correspondence relation between a touch gesture 410 that changes the touch force to the second step strength and a shortcut function 412. Further, in all the touch gestures 410 illustrated in FIG. 17, it is assumed that three fingers including the index finger, the middle finger, and the ring finger initially touch the operation surface 30.

For example, in a touch gesture 410a illustrated in FIG. 17, when it is detected that only the touch force of the index finger is increased to the second step strength in a state in which the three fingers are touching as indicated by shadings of different types from those of FIG. 16, the processing executing unit 104 executes a "grouping" function 412a which is previously associated with the touch gesture 410a. Similarly, when touch gestures 410b to 410g illustrated in FIG. 17 are detected, the processing executing unit 104 executes the associated shortcut functions 412b to 412g.

Further, as a modified example of the examples illustrated in FIGS. 16 and 17, it is also possible to increase the number of fingers used for an operation or to increase a step number of the touch force to be distinguished. Accordingly, it is possible to further increase the number of correspondence relations, that is, the number of types of shortcut functions executable with the touch gesture. For example, when five fingers are used and the step number of the touch force to be distinguished is 2, 242 ($=3^5-1$) correspondence relations can be set.

Correspondence Relation Example 3

Figure 18:
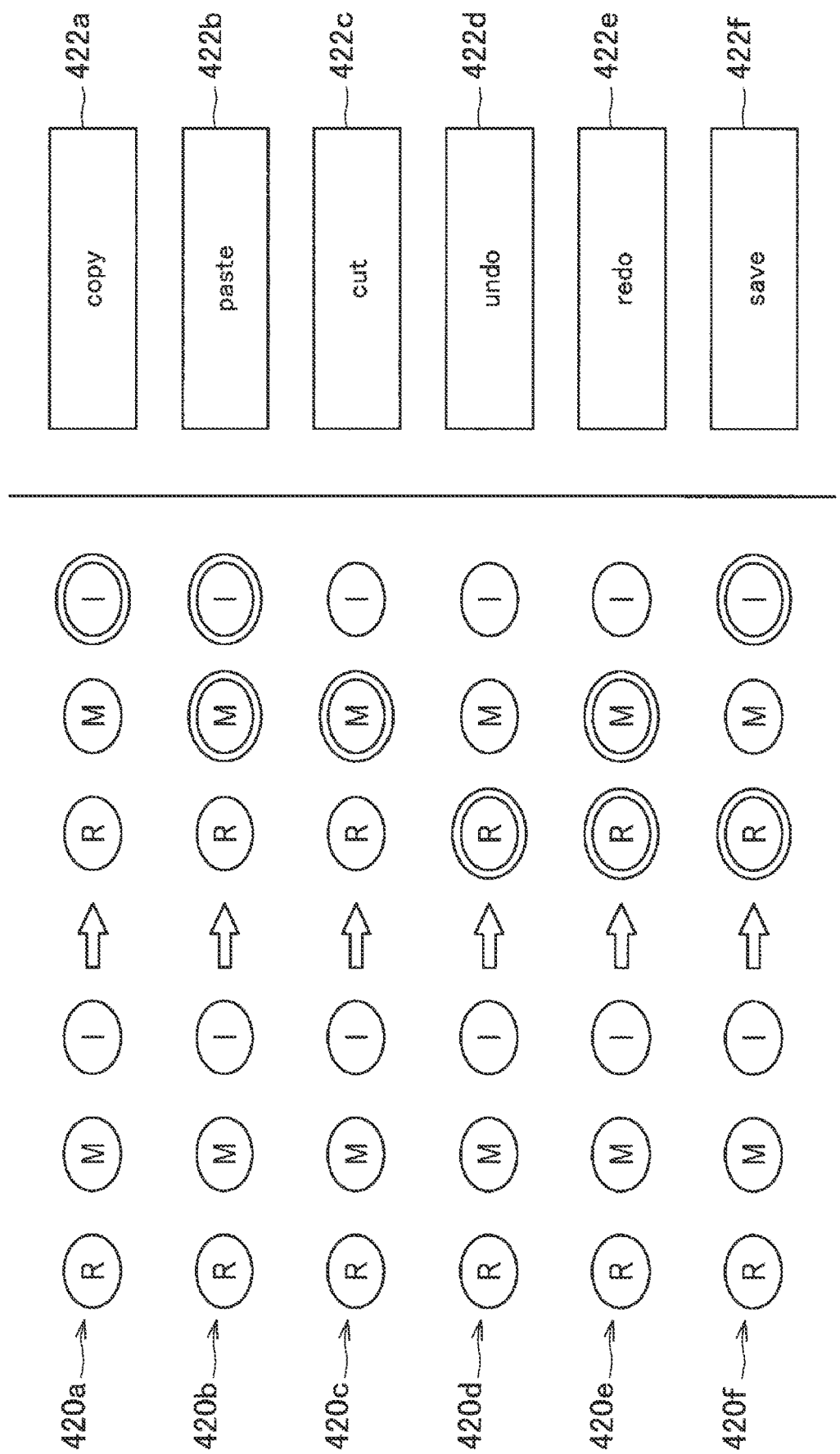
FIG. 18 is an explanatory diagram illustrating another example of a correspondence relation between the touch gesture and the shortcut function.

Next, an example of a method using the number of taps of a finger among methods of executing a shortcut function through a touch gesture will be described with reference to FIG. 18. FIG. 18 is an explanatory diagram illustrating a correspondence relation between a touch gesture 420 using a single tap and a shortcut function 422. Further, in all the touch gestures 420 illustrated in FIG. 18, it is assumed that three fingers including the index finger, the middle finger, and the ring finger initially touch the operation surface 30.

For example, in a touch gesture 420a illustrated in FIG. 18, when it is detected that a single tap is performed by the index finger in a state in which the middle finger and the ring finger are touching as indicated by a double circle, the processing executing unit 104 executes a "copy" function 422a which is previously associated with the touch gesture 420a.

Similarly, when touch gestures 420b to 420f illustrated in FIG. 18 are detected, the processing executing unit 104 executes the associated shortcut functions 422b to 422f. Since the number of fingers is 3, the number of taps is 1, and a tap is unable to be simultaneously performed by the three fingers (because the three fingers are separated from the operation surface 30 at the same time), a maximum of 6 ($=2^3-2$) correspondence relations can be set as illustrated in FIG. 18.

Correspondence Relation Example 4

Figure 19:
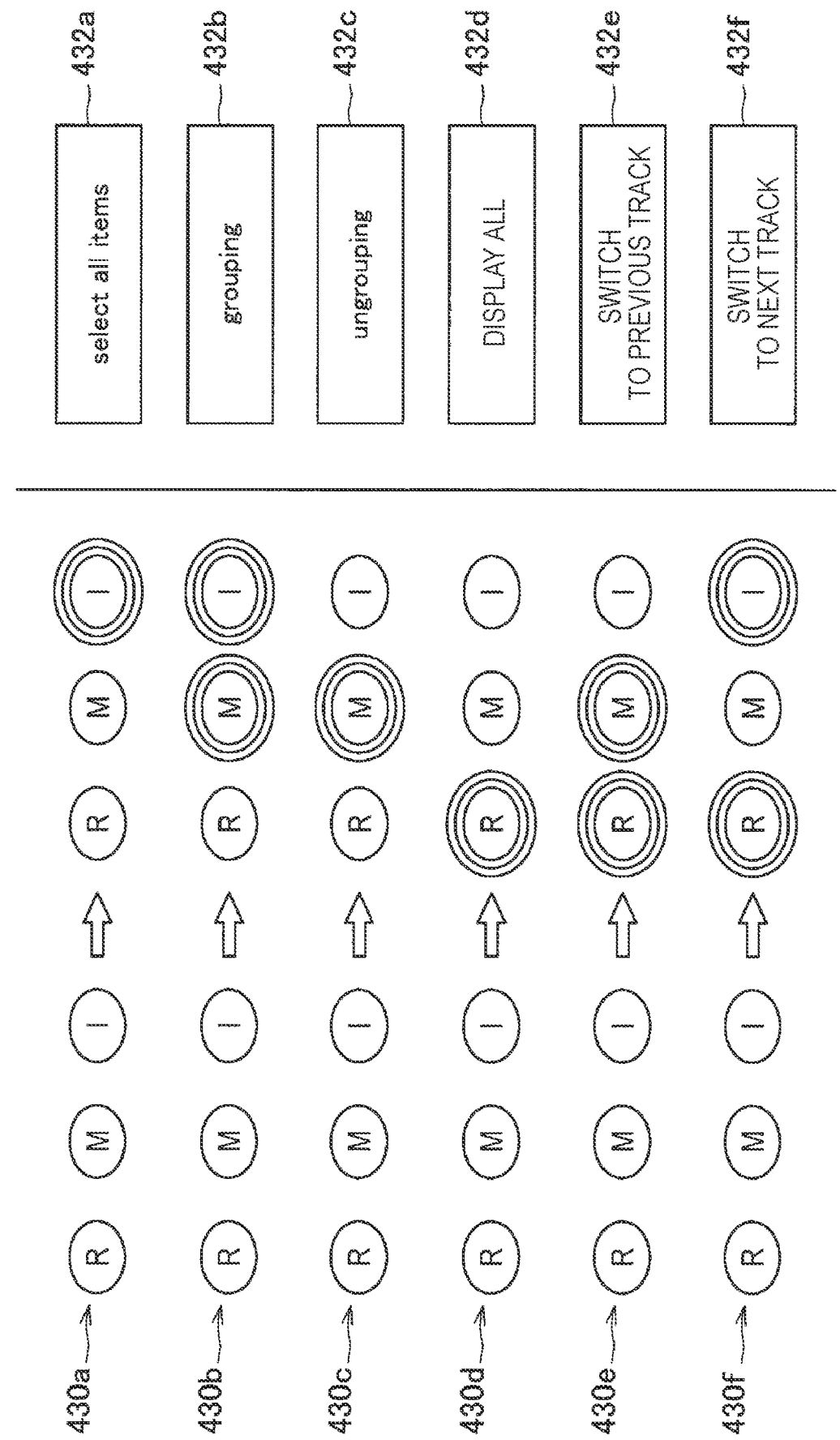
FIG. 19 is an explanatory diagram illustrating another example of a correspondence relation between the touch gesture and the shortcut function.

Next, another example of a method using the number of taps of a finger among methods of executing a shortcut function through a touch gesture will be described with reference to FIG. 19. FIG. 19 is an explanatory diagram illustrating a correspondence relation between a touch gesture 430 using a double tap and a shortcut function 432. Further, in all the touch gestures 430 illustrated in FIG. 19, it is assumed that three fingers including the index finger, the middle finger, and the ring finger initially touch the operation surface 30.

For example, in a touch gesture 430a illustrated in FIG. 19, when it is detected that a double tap is performed by the index finger in a state in which the middle finger and the ring finger are touching as indicated by a triple circle, the processing executing unit 104 executes a "select all items" function 432a which is previously associated with the touch gesture 430a. Similarly, when touch gestures 430b to 430f illustrated in FIG. 19 are detected, the processing executing unit 104 executes the associated shortcut functions 432b to 432f.

Further, as a modified example of the examples illustrated in FIGS. 18 and 19, it is possible to increase the number of correspondence relations by further increasing the number of fingers used for an operation or by increasing the number of taps to be distinguished.

Correspondence Relation Example 5

Figure 20:
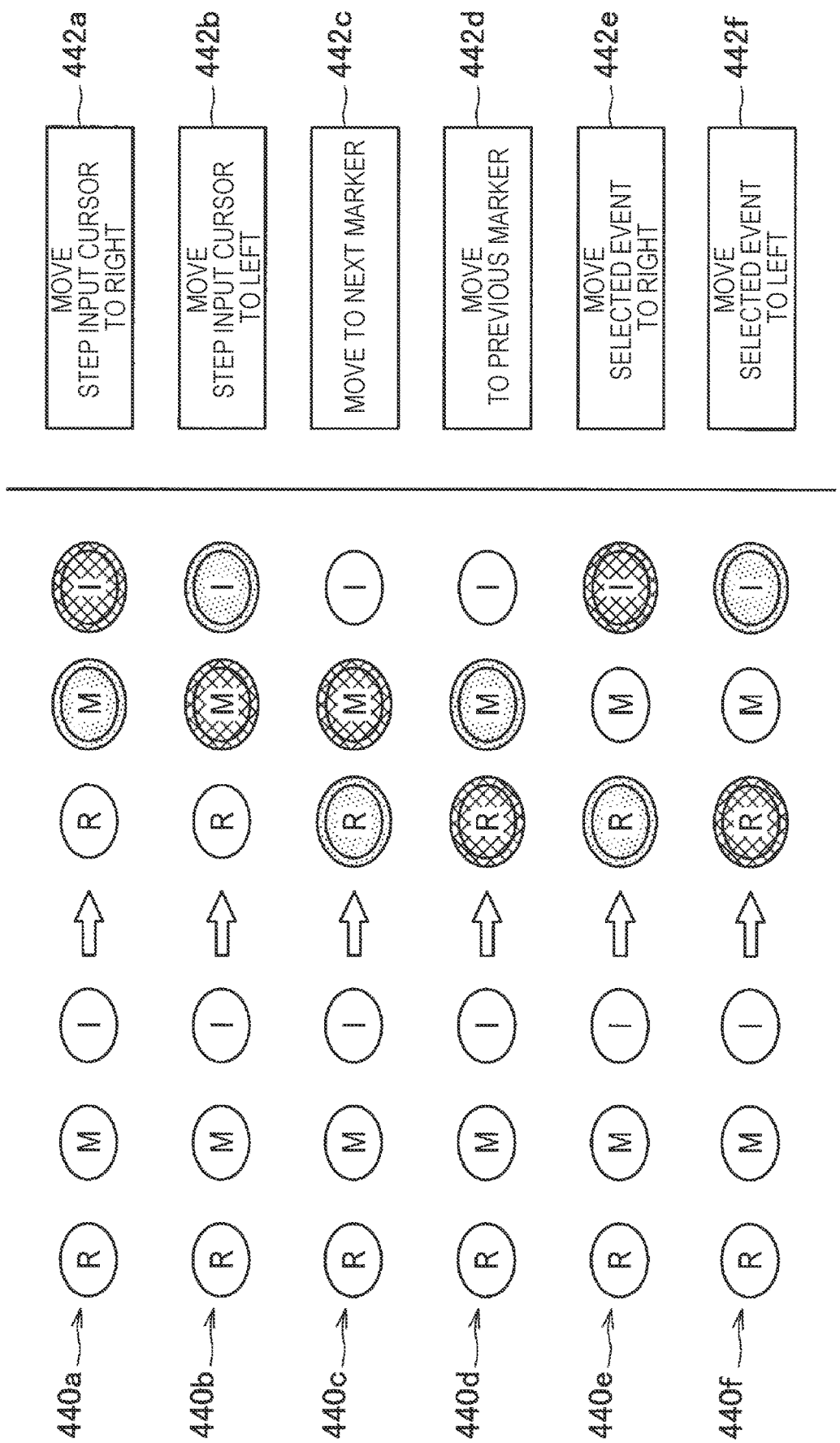
FIG. 20 is an explanatory diagram illustrating another example of a correspondence relation between the touch gesture and the shortcut function.

Next, an example of a method using an order of tapping fingers among methods of executing a shortcut function through a touch gesture will be described with reference to FIG. 20. FIG. 20 is an explanatory diagram illustrating a correspondence relation between a touch gesture 440 of performing a single tap with each of two fingers and a shortcut function 442. Further, in all the touch gestures 440 illustrated in FIG. 20, it is assumed that three fingers including the index finger, the middle finger, and the ring finger initially touch the operation surface 30.

For example, in a touch gesture 440a illustrated in FIG. 20, in a state in which the ring finger is touching, when it is detected that a single tap is performed by the middle finger, and then a single tap is performed by the index finger as indicated by two double circles having different types of shadings, the processing executing unit 104 executes a "move a step input cursor to the right" function 422a which is previously associated with the touch gesture 440a. Similarly, when touch gestures 440b to 440f illustrated in FIG. 20 are detected, the processing executing unit 104 executes the associated shortcut functions 442b to 442f.

The above-described methods (the correspondence relation examples 1 to 5) are not limited to an example in which they are applied independently, and a plurality of methods may be combined. Further, the correspondence relations between the touch gesture and the shortcut function illustrated in FIGS. 16 to 20 are examples, and an arbitrary correspondence relation can be set. Further, the correspondence relation between the touch gesture and the shortcut function may be changed by the user as necessary.

(2-1-3-3. Modified Examples)

Modified Example 1

As a modified example, the processing executing unit 104 is also able to execute a process which is associated with a designation target specified by the designation target specifying unit 108 to be described later in addition to the result of detecting touches of a plurality of fingers acquired by the detection result acquiring unit 102. For example, the processing executing unit 104 executes a different process for each designation target specified by the designation target specifying unit 108 (even when the results of detecting touches of a plurality of fingers acquired by the detection result acquiring unit 102 are the same).

Figure 21:
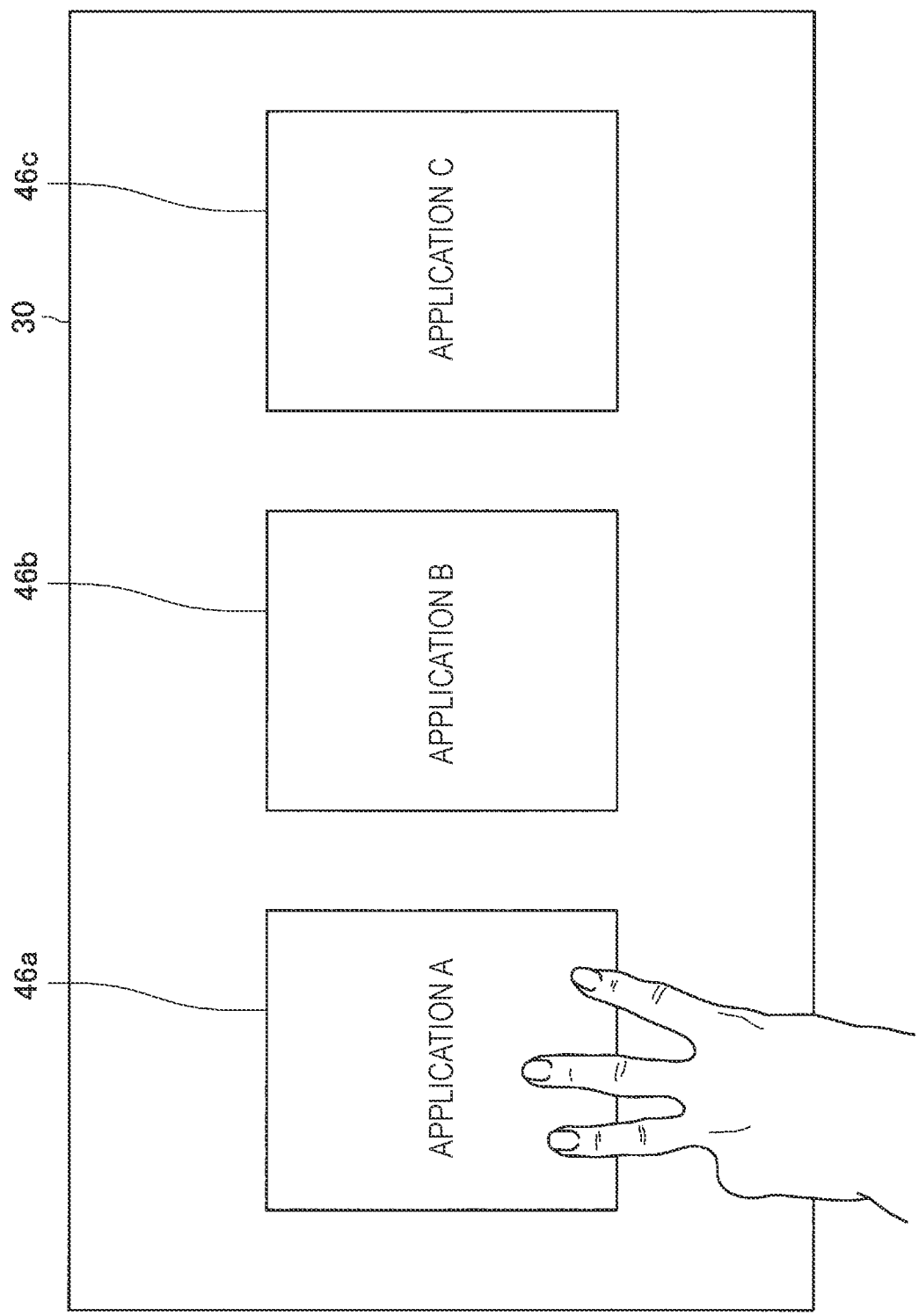
FIG. 21 is a diagram illustrating a form of a touch operation when a user designates a window among a plurality of windows being displayed.

As one example, the processing executing unit 104 executes a different process for each type of window which is specified by the designation target specifying unit 108 and designated by the user. Here, this function will be described in further detail with reference to FIG. 21. FIG. 21 is an explanatory diagram illustrating an example in which three kinds of application screens 46 are displayed on the operation surface 30. In the example illustrated in FIG. 21, the processing executing unit 104 executes different processes when an application A screen 46a is designated by the user, when an application B screen 46b is designated, when an application C screen 46c is designated, and when an area on which a window is not displayed is designated. For example, when it is specified that the application A screen 46a is designated by the user, the processing executing unit 104 first extracts a process associated with the result of detecting touches of a plurality of fingers acquired by the detection result acquiring unit 102 among a plurality of processes associated with the application A screen 46a, and executes the extracted process.

Figure 22:
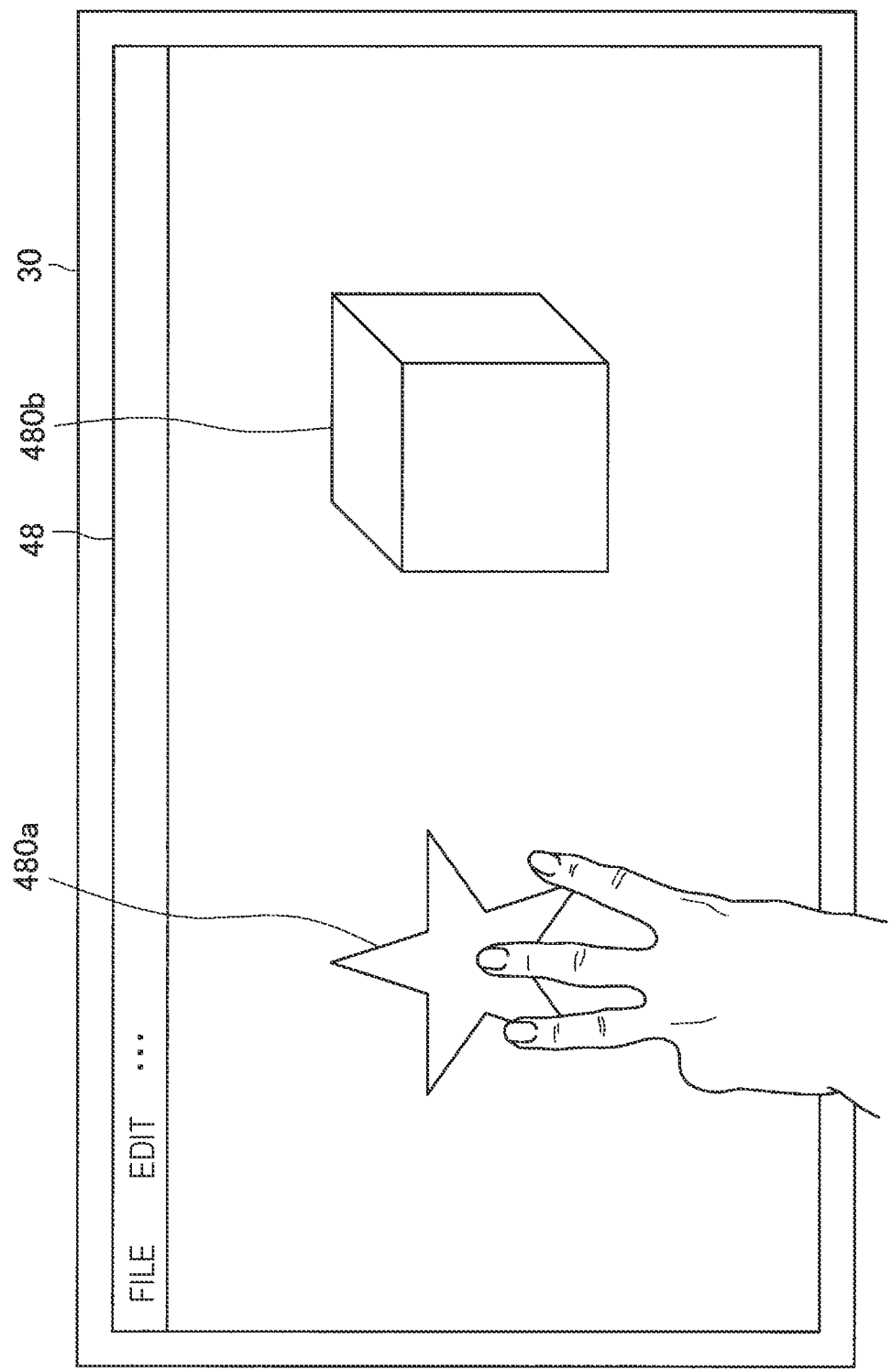
FIG. 22 is a diagram illustrating a form of a touch operation when user designates an object among a plurality of objects being displayed.

Further, the processing executing unit 104 executes a different process for each type of object which is specified by the designation target specifying unit 108 and designated by the user. Here, this function will be described in further detail with reference to FIG. 22. FIG. 22 is an explanatory diagram illustrating an example in which an application screen 48 including a plurality of kinds of objects 480 is displayed on the operation surface 30. In the example illustrated in FIG. 22, an object 480a is a two-dimensional object, and an object 480b is a three-dimensional object.

In the example illustrated in FIG. 22, the processing executing unit 104 executes different processes when the object 480a is designated by the user, when the object 480b is designated, and when an area on which no object is displayed is designated. For example, although the types of detected touch gestures are the same, when it is specified that the object 480a is designated by the user, the processing executing unit 104 moves the object 480a on the application screen 480a, and when it is specified that the object 480b is designated by the user, the processing executing unit 104 rotates the object 480b.

Modified Example 2

Further, the processing executing unit 104 may execute a predetermined process on the basis of a combination of the result of detecting another input operation performed by the user and the result of detecting touches of a plurality of fingers acquired by the detection result acquiring unit 102. For example, when a detection result indicating that it is detected that the user is drawing a line on the operation surface 30 with one hand using a stylus, and the user touches the drawn line, for example, with three fingers of the other hand is acquired by the detection result acquiring unit 102, the processing executing unit 104 may change a display of the drawn line on the basis of the acquired detection result. As an example, in the above example, the processing executing unit 104 may change a type of color of the line, a density of a color of the line, a line type, a thickness of the line, or the like on the basis of the result of detecting touches of the three fingers.

Modified Example 3

The processing executing unit 104 is also able to execute a predetermined process on the basis of chronological information of the result of detecting touches of a plurality of fingers acquired by the detection result acquiring unit 102. For example, first, when it is detected that three fingers including the index finger, the middle finger, and the ring finger touch the operation surface 30, a tap is then performed by the index finger in a state in which the middle finger and the ring finger are touching, and the touch force of the index finger is increased to the first step strength, the processing executing unit 104 executes a process which is associated with the following order: (the touches of the three fingers, the tap of the index finger, one step pushing of the index finger).

Further, when an input of cancelling the touch gesture performed by the user is detected, the server 10 is also able to recognize that the chronological touch input is canceled in the middle. Here, examples of the input of cancelling the touch gesture include a motion of separating all the fingers touching the operation surface 30 from the operation surface 30 and a motion of performing a specific touch gesture such as a scratch gesture of moving a plurality of fingers touching the operation surface 30 back and forth on the operation surface 30.

Modified Example 4

Further, the processing executing unit 104 may execute different processes (even in the case of the same touch gesture) on the basis of a result of detecting a length of a time in which the finger is touching the operation surface 30.

Modified Example 5

Further, the processing executing unit 104 may further execute different processes (even in the case of the same touch gesture) on the basis of a result of detecting whether a hand used for a touch gesture is the left hand or the right hand.

Modified Example 6

Further, the processing executing unit 104 may determine a type of touching finger on the basis of an image captured by the camera 22 or a result of detecting a contact state in the operation surface 30 and execute a process in accordance with the type of finger which is determined (even in the case of the same touch gesture).

Modified Example 7

Further, the processing executing unit 104 may determine the number of fingers used for an operation on the basis of an image captured by the camera 22 or a result of detecting a contact state in the operation surface 30 and execute a process in accordance with the number of fingers which is determined (even in the case of the same touch gesture). For example, the processing executing unit 104 may execute "application switching" when the determined number of fingers is 2 and execute "shortcut screen switching" when the determined number of fingers is 3.

[2-1-4. Output Control Unit 106]

(2-1-4-1. Output of Touch Force Strength)

The output control unit 106 controls an output of the result of detecting touches of a plurality of fingers acquired by the detection result acquiring unit 102. For example, the output control unit 106 causes the display unit 20 to perform display indicating a result of detecting a touch force strength of each of a plurality of fingers on the operation surface 30. As an example, the output control unit 106 causes the display unit 20 to perform display indicating a result of detecting the touch force strength of each of a plurality of fingers near the touch position of each of a plurality of fingers on the operation surface 30 or the touch position.

Display Example 1

Further, the output control unit 106 increases a display area of a display indicating the result of detecting the touch force strength of each of a plurality of fingers as the detected touch force strength of each of the plurality of fingers increases. Here, this function will be described in further detail with reference to FIGS. 23 and 24. For example, as illustrated in a left diagram of FIG. 23, when the touch force of the middle finger among the three fingers touching the operation surface 30 is increased to the first step strength, the output control unit 106 causes, for example, a first circle 500a to be displayed near the middle finger on the operation surface 30 as a touch strength detection result display 50a. Further, as illustrated in a right diagram of FIG. 23, when the touch force of the middle finger is increased to the second step strength, for example, the output control unit 106 causes the first circle 500a and a second circle 500b which is arranged outside the first circle 500a and larger than the first circle 500a to be displayed on the operation surface 30 as a touch strength detection result display 50b. According to this display example, it is possible to allow the user to easily recognize the step of the current touch force.

Similarly, as illustrated in a left diagram of FIG. 24, when the touch force of the middle finger is increased to a third step strength, for example, the output control unit 106 causes the first circle 500a, the second circle 500b, and a third circle 500c which is arranged outside the second circle 500b and larger than the second circle 500b to be displayed on the operation surface 30 as a touch strength detection result display 50c. Further, as illustrated in a right diagram of FIG. 24, when the touch force strength of the middle finger reaches the highest step (a fourth step in the example illustrated in FIG. 24), for example, the output control unit 106 causes a maximum value display 502 arranged outside the outermost circle 550 (the third circle 500c) and various kinds of circles 500 to be displayed on the operation surface 30 as a touch strength detection result display 50d. For example, the maximum value display 502 is a display having a different shape from the circle 500 as illustrated in FIG. 24. However, the present disclosure is not limited to this example, and the maximum value display 502 may be a display (having the same shape but) having a different color, line type, line thickness, or the like from the circle 500. According to this display example, it is possible to allow the user to easily recognize that the touch force strength has reached the highest step.

Modified Example

As a modified example, the output control unit 106 may perform display indicating a touch force strength detection amount (that is, analog display) in addition to the display indicating the step of the touch force strength of each of a plurality of fingers. For example, the output control unit 106 may change a color of a circumference of a circle (which is the touch strength detection result display 50) when the step of the touch force strength changes while changing a diameter of the circle in accordance with the touch force strength detection amount. As an example, the output control unit 106 may continuously increase the diameter of the circle as the touch force strength increases and continuously decrease the diameter of the circle as the touch force strength decreases. Further, the output control unit 106 may change the color of the circumference of the circle from "black" to "red" when the step of the touch force strength is switched from a 0-th strength to the first step strength and change the color of the circumference of the circle from "red" to "blue" when the step of the touch force strength is switched from the first step strength to the second step strength.

In the above example, the diameter is changed as the display indicating the touch force strength detection amount, and the color is changed as the display indicating the step of the touch force strength, but the present disclosure is not limited to this example. For example, the output control unit 106 may change, for example, one of a plurality of display types such as a diameter (size), a color, a shape, a line thickness, and the like as the display indicating the touch force strength detection amount and change another one of the plurality of display types as the display indicating the step of the touch force strength.

Display Example 2

Alternatively, the output control unit 106 may gradually change a display form in a predetermined area as the detected touch force strength of each of a plurality of fingers increases. For example, the output control unit 106 may gradually increase a display range of a display indicating a result of detecting the touch force strength within a predetermined area as the detected touch force strength of each of the detected a plurality of fingers increases. Here, this function will be described in further detail with reference to FIG. 25. For example, as illustrated in a left diagram of FIG. 25, when the touch force of the middle finger among the three fingers touching the operation surface 30 is increased to the first step strength, the output control unit 106 causes a frame 520 such as a rectangle to be displayed near the middle finger on the operation surface 30 as a touch strength detection result display 52a. Further, as illustrated in a right diagram of FIG. 25, when the touch force of the middle finger is increased to the second step strength, the output control unit 106 causes the frame 520 and a step display 522 having a different color or form (from a background) which is displayed from the frame 520 toward the inside of the frame 520 to be displayed on the operation surface 30 as a touch strength detection result display 52b. Furthermore, when the touch force of the middle finger is increased to the third step strength, the output control unit 106 further enlarges the step display 522 by a predetermined range and causes the resulting step display 522 to he displayed toward the inside of the frame 520. According to this display example, it is possible to allow the user to easily recognize how far the current touch force strength is from the highest step.

As a modified example, the output control unit 106 may gradually change a type of color, a density of a color, or a form of the entire predetermined area on the basis of the result of detecting the detected touch force strength of each of a plurality of fingers.

Other Output Methods

Alternatively, when the step of the touch force strength of one of a plurality of fingers touching the operation surface 30 is changed, the output control unit 106 may cause a speaker (not illustrated) to output a sound with a type of sound, the number of sounds, or a length of a sound which is associated with a changed step in advance. Alternatively, in the above example, the output control unit 106 may vibrate the operation surface 30, for example, a position of a corresponding finger on the operation surface 30 with a type of vibration, the number of vibrations, or a length of a vibration which is associated with a changed step in advance. According to the output examples, when the touch force is increased, it is possible to allow the user to recognize the changed step or a change amount.

(2-1-4-2. Output of Function Candidate)

Further, the output control unit 106 is able to perform display indicating an executable process candidate on the operation surface 30. For example, when it is detected that the operation surface 30 is touched by three fingers, the output control unit 106 performs display indicating a correspondence relation between all types of touch gestures using three fingers and process candidates at a predetermined position such as the right side of the three fingers.

Figure 26:
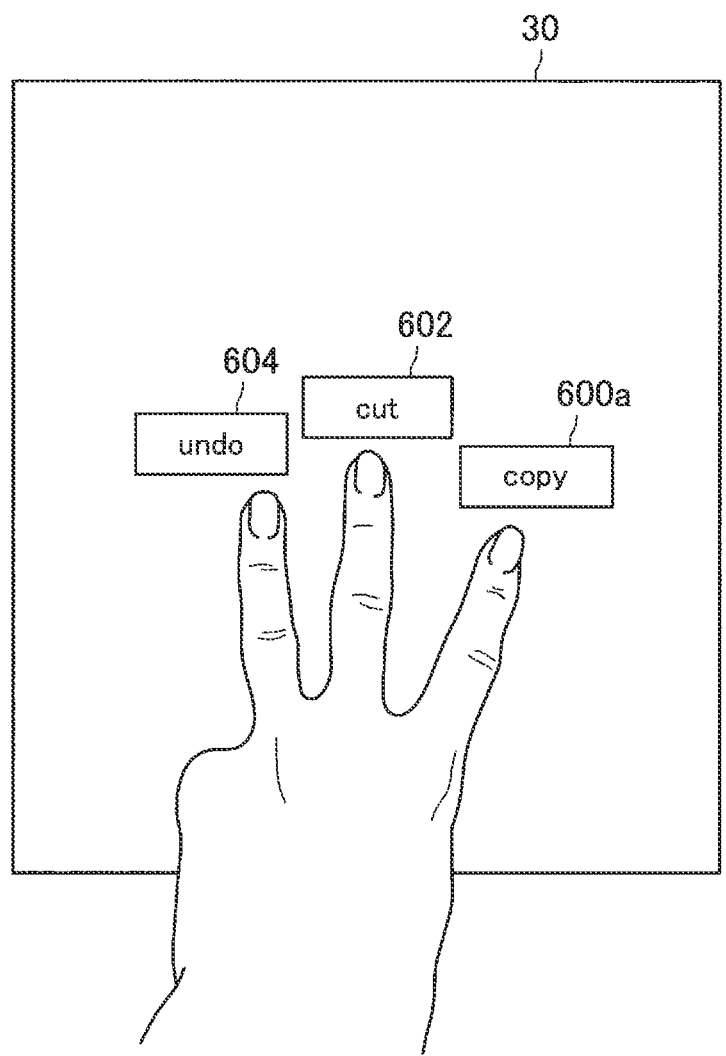
FIG. 26 is an explanatory diagram illustrating a display example of a display image indicating shortcut functions which are executable by a plurality of touching fingers.

Alternatively, the output control unit 106 performs display indicating candidates of a process associated with a result of detecting a touch of each of a plurality of fingers acquired by the detection result acquiring unit 102 at a position associated with each of the plurality of fingers on the operation surface 30. Here, this function will be described in further detail with reference to FIG. 26 and FIG. 27. FIG. 26 is an explanatory diagram illustrating an example in which a display image indicating an executable shortcut function is displayed on the operation surface 30 when the force of each of the three fingers is increased to the first step strength when the operation surface 30 is touched with the three fingers. A display example of a display image indicating only executable shortcut functions when only the touch force of one finger is increased is illustrated in FIG. 26.

As illustrated in FIG. 26, for example, the output control unit 106 causes a display image 600a indicating an executable function ("copy") when only the touch force of the index finger is increased to the first step strength to be displayed near the touch position of the index finger. Similarly, the output control unit 106 causes a display image 602 indicating an executable function ("cut") when only the touch force of the middle finger is increased to the first step strength to be displayed near the touch position of the middle finger, and causes a display image 604 indicating an executable function ("undo") when only the touch force of the ring finger is increased to the first step strength to be displayed near the touch position of the ring finger.

Figure 27:
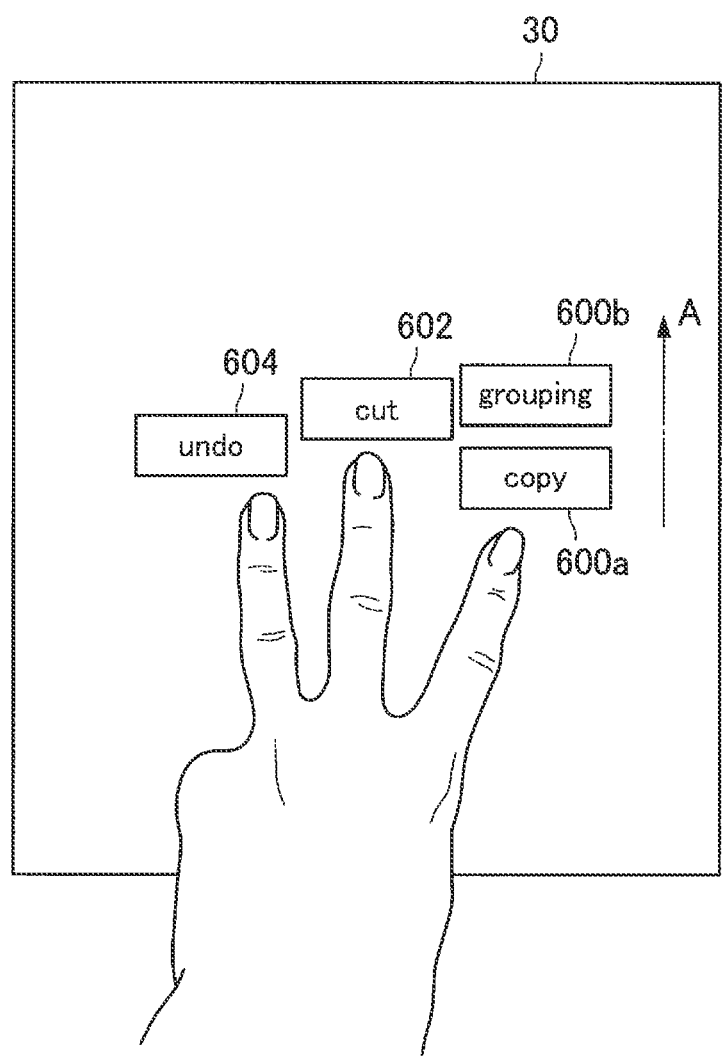
FIG. 27 is an explanatory diagram illustrating a display example of a display image indicating shortcut functions which are executable by a plurality of touching fingers.

FIG. 27 is an explanatory diagram illustrating a display example of display images 600 to 604 whose display is updated when only the touch force of the index finger is increased to the first step strength on the operation surface 30 in the touch state illustrated in FIG. 26. As illustrated in FIG. 27, the output control unit 106 causes a display image 600b indicating an executable function ("grouping") when the touch force of the index finger is the second step strength to be further displayed at a position adjacent to the display image 600a (indicating the executable function when the touch force of the index finger is the first step strength), for example, in a direction indicated by an arrow A. Further, when there is no change in the step of the touch force of any finger from the state illustrated in FIG. 27 during a predetermined time, the processing executing unit 104 executes "copy" which is a shortcut function corresponding to the display image 600a (since it is a state in which the touch force of the index finger is increased to the first step strength).

Further, when the touch force of the index finger is increased to the highest step from the state illustrated in FIG. 27, the output control unit 106 may enlarge display of all the displayed display images 600 indicating the executable shortcut function when the touch force of the index finger is increased by one step or more (or only the display image 600 indicating the executable shortcut function when the touch force of the index finger is the highest step), may change a color of the display, or may cause display text to shine.

Modified Example

In the above description, the display examples illustrated in FIGS. 26 to 27 are the examples in which a display image indicating an executable shortcut function is displayed when the touch force strength of each finger is increased, but the present disclosure is not limited to the above examples. For example, in the display example illustrated in FIGS. 26 to 27, a display image indicating an executable shortcut function may be displayed on the operation surface 30 in accordance with the number of taps of each finger. More specifically, the display images 600 to 604 illustrated in FIG. 26 may be display examples of display images indicating an executable shortcut function when a tap is performed by only one finger. Further, in the display example illustrated in FIG. 27. Displays of the display images 600 to 604 illustrated in FIG. 26 may be updated when a single tap is performed by the index finger on the operation surface 30. Further, when no tap is performed by any of the fingers during a predetermined time in the state illustrated in FIG. 27, the processing executing unit 104 may execute "copy" which is a shortcut function corresponding to the display image 600a (since it is a state in which a single tap is performed by the index finger).

[2-1-5. Designation Target Specifying Unit 108]

(2-1-5-1. Specific Example 1)

The designation target specifying unit 108 specifies a designation target designated by the user on the operation surface 30 on the basis of a result of detecting touches of a plurality of fingers acquired by the detection result acquiring unit 102. For example, the designation target specifying unit 108 specifies an object located at a representative point designated by the user on the operation surface 30 as an object designated by the user. Here, the representative point may be a position that a predetermined finger such as the middle finger touches or holds down or may be a center of gravity position which is calculated from touch positions of a plurality of fingers touching the operation surface 30.

For example, in the example illustrated in FIG. 21, the designation target specifying unit 108 specifies the application A screen 46a displayed at the position touched by the middle finger as a window designated by the user. Further, in the example illustrated in FIG. 22, the designation target specifying unit 108 specifies the object 480a displayed at the position touched by the middle finger as an object designated by the user.

(2-1-5-2 Specific Example 2)

Alternatively, the designation target specifying unit 108 can specify the designation target designated by the user on the basis of a result of detecting an operation performed by another hand of the user on the operation surface 30. For example, the designation target specifying unit 108 may specify an object which is selected through a touch operation such as a touching, pinching, or tracing operation performed by another hand of the user on the operation surface 30 or an input device such as stylus or a mouse as an object designated by the user.

[2-1-6. Communication Unit 120]

The communication unit 120 performs transmission and reception of information with other devices that are able to perform communication with the server 10. For example, under the control of the output control unit 106, the communication unit 120 transmits the result of detecting touches of a plurality of fingers acquired by the detection result acquiring unit 102 to the display unit 20 or the operation surface 30. Further, the communication unit 120 receives the result of detecting touches of a plurality of fingers acquired through the operation surface 30 from the operation surface 30 or receives the captured image of the operation surface 30 from the camera 22.

[2-1-7. Storage Unit 122]

For example, the storage unit 122 associates the touch gesture using a plurality of fingers with the process identification information in advance. Further, the storage unit 122 stores various kinds of data and various kinds of software.

<2-2. Operation>

The configuration of the present embodiment has been described above. Next, an operation according to the present embodiment will be described with reference to FIGS. 28 and 29. Here, an example of an operation in a situation in which a predetermined process is executed on the basis of a result of detecting a touch strength and a tap of each finger after three fingers touch the operation surface 30 will be described.

Figure 28:
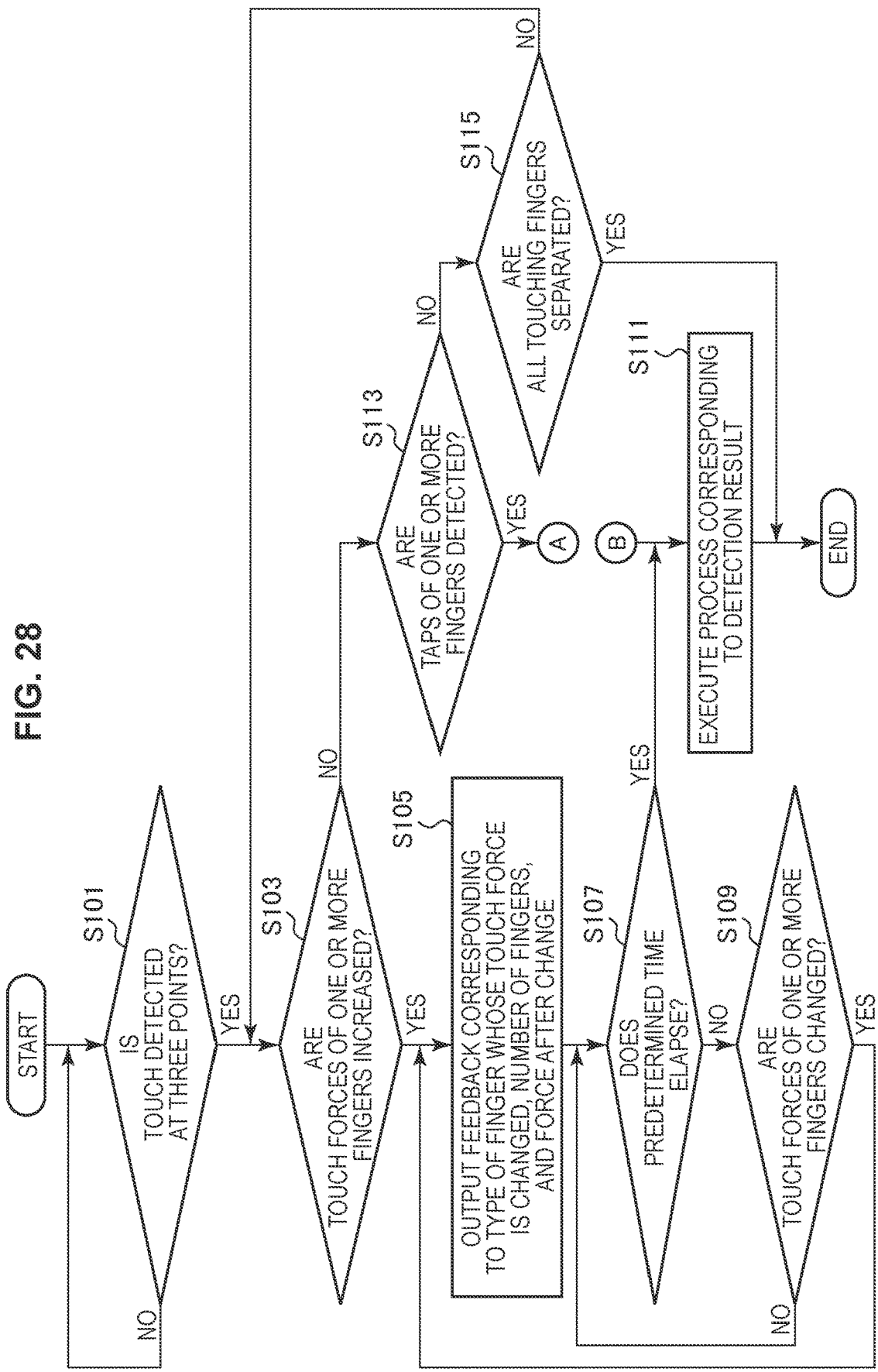
FIG. 28 is a flowchart illustrating some operations according to the embodiment.

As illustrated in FIG. 28, first, the processing executing unit 104 of the server 10 determines whether or not a detection result indicating that three fingers touch the operation surface 30 is acquired (S101). When the detection result indicating the touches of the three fingers is not acquired, the processing executing unit 104 performs the operation of S101 again, for example, after a predetermined time elapses.

On the other hand, when the detection result indicating the touches of the three fingers is acquired, the processing executing unit 104 then determines whether or not a detection result indicating that touch forces of one or more fingers among the three fingers are increased by one step or more is acquired (S103). When a detection result indicating that touches of one or more fingers are increased by one step or more is acquired, the output control unit 106 causes, for example, feedback such as a display corresponding to a result of detecting a type of finger whose touch force step is changed, the number of fingers, and the step number of the touch force of each finger after the change to the output on the operation surface 30 (S105).

Thereafter, the processing executing unit 104 determines whether or not a predetermined time elapses, for example, from an execution time of S105 (S107). When the predetermined time does not elapse, the processing executing unit 104 then determines whether or not a detection result indicating that the touch force of one or more fingers among the three fingers is changed by one or more steps is acquired (S109). When the touch force of none of the fingers is not changed by one or more steps, the processing executing unit 104 performs the operation of S107 again. On the other hand, when the detection result indicating that the touch force of one or more fingers is changed by one or more steps is acquired, the processing executing unit 104 performs the operation of S105 again.

When the predetermined time elapses in S107, the processing executing unit 104 performs a process which is associated with the result of detecting the touch strength or the tap of each finger in S103, S109, S113 to be described later, or S125 to be described later (S111). Then, the server 10 ends the present operation.

When no increase by one step or more is detected in the touch force of any of the fingers in S103, the processing executing unit 104 then determines that a detection result indicating that one or more taps are performed by one or more fingers is acquired (S113). When a detection result indicating that one or more taps are performed by one or more fingers is acquired, the output control unit 106 performs an operation of S121 to be described later.

On the other hand, when no tap is performed by any of the fingers, the processing executing unit 104 then determines whether or not a detection result indicating that all three fingers are separated from the operation surface 30 is acquired (S115). When a detection result indicating that all three fingers are separated from the operation surface 30 is acquired, the server 10 ends the present operation.

On the other hand, when one or more of the three fingers is detected not to be separated from the operation surface 30, the processing executing unit 104 performs the operation of S103 again.

Figure 29:
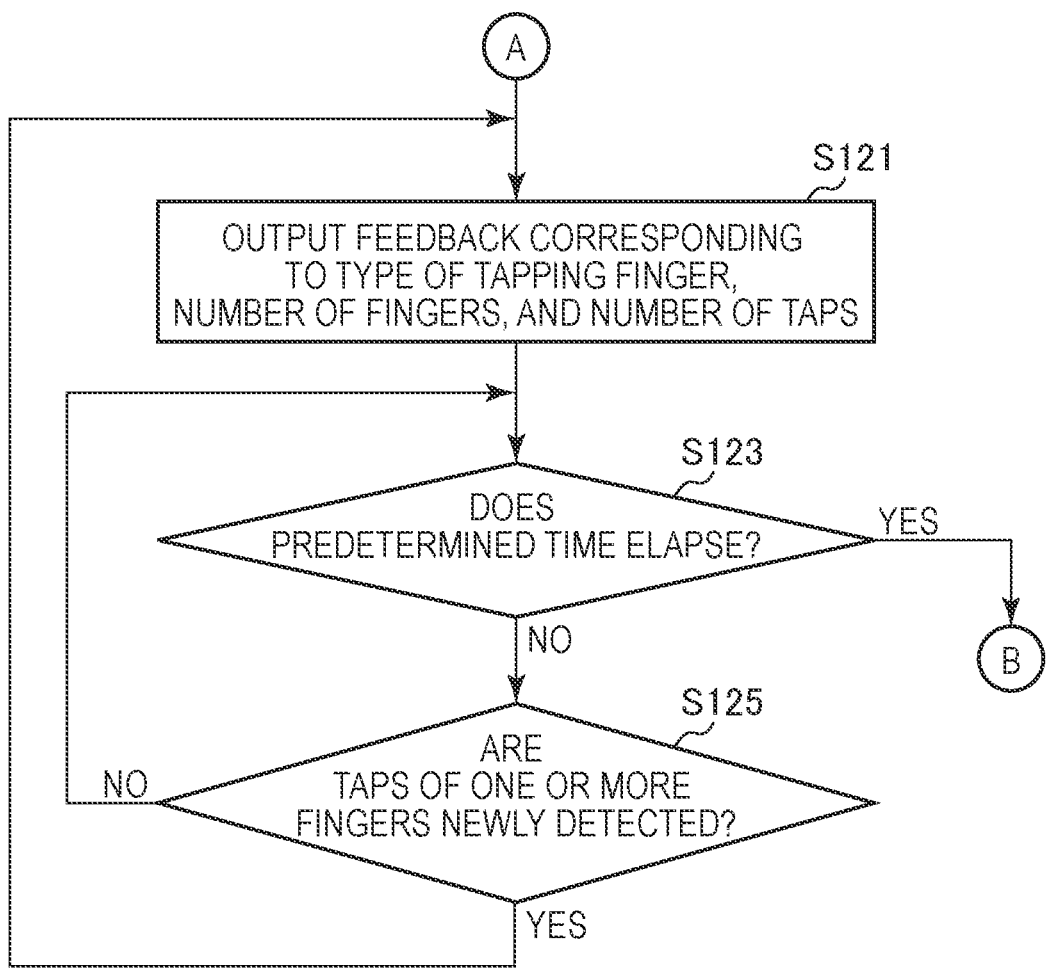
FIG. 29 is a flowchart illustrating some operations according to the embodiment.

Here, an operation when it is detected in S113 that one or more taps are performed by one or more fingers (Yes in S113) will be described with reference to FIG. 29. As illustrated in FIG. 29, the output control unit 106 causes, for example, feedback such as a display corresponding to a result of detecting a type of tapping finger, the number of fingers, and the number of taps to be output on the operation surface 30 (S121).

Thereafter, the processing executing unit 104 determines whether or not a predetermined time elapses, for example, from the execution time of S121 (S123). When the predetermined time does not elapse, the processing executing unit 104 then determines whether or not a detection result indicating that one or more taps are newly performed by one or more fingers among the three fingers is acquired (S125). When no tap is detected from any of the fingers, the processing executing unit 104 performs the operation of S123 again. On the other hand, when the detection result indicating that one or more taps are newly performed with one or more fingers is acquired, the processing executing unit 104 performs the operation of S121 again.

When the predetermined time elapses in S123, the processing executing unit 104 performs the operation of S111.

<2-3. Effects>
[2-3-1. Effect 1]

As described above with reference to FIGS. 2, 28, and 29 and the like, according to the present embodiment, it is possible to increase types of touch gestures which are uniquely identified using a combination of results of detecting touch strengths of individual fingers in addition to the number of fingers touching the operation surface 30 or a motion of fingers. As a result, it is possible to increase the number of types of processes that can be implemented by the touch gesture.

Further, since the number of types of touch gestures is increased, the user need not touch the operation surface 30, for example, many times in order to perform a desired process, and thus the efficiency of the operation can be improved. For example, since individual touch gestures are associated with shortcut functions in advance as illustrated in FIGS. 16 to 20, the user is able to easily select and operate a desired shortcut function.

[2-3-2. Effect 2]

Further, the server 10 according to the present embodiment is able to cause a display indicating a result of detecting the touch force strength of each of a plurality of fingers to be performed near a touch position of each of the plurality of fingers on the operation surface 30. Thus, it is possible to allow the user to easily recognize a current touch force step of each finger.

[2-3-3. Effect 3]

Further, the server 10 according to the present embodiment is able to cause a display indicating a candidate of a process which is associated with a result of detecting a touch force strength, the number of taps, or the like of each of a plurality of fingers on the operation surface 30 to be displayed near a touch position of each of the plurality of fingers on the operation surface 30. Thus, it is possible to allow the user to easily recognize a process that can be executed by the touch operation of each finger. For example, it is possible to allow the user to recognize a process executable by a current touch force strength of each finger or a process executable when the touch force of each finger is increased. As a result, the user can easily select a desired process and cause the server 10 to execute the selected process.

«3. Hardware Configuration»

Figure 30:
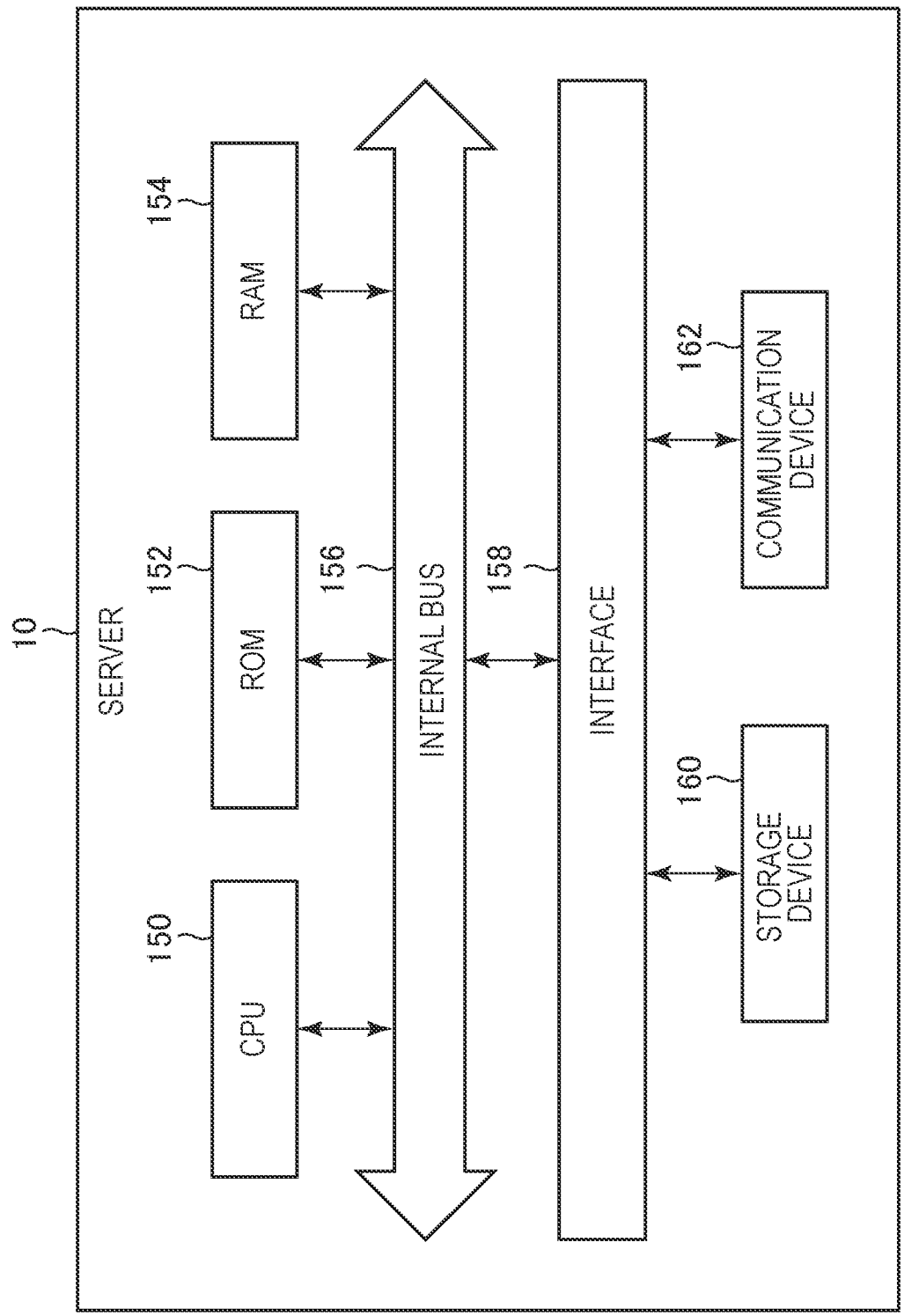
FIG. 30 is an explanatory diagram illustrating a hardware configuration of a server 10 according to the embodiment.

Next, a hardware configuration of the server 10 according to the present embodiment will be described with reference to FIG. 30. As illustrated in FIG. 30, the server 10 includes a CPU 150, a read only memory (ROM) 152, a RAM 154, an internal bus 156, an interface 158, a storage device 160, and a communication device 162.

The CPU 150 functions as an operation processing device and a control device and controls the operation of the server 10 in general in accordance with various kinds of programs. Further, the CPU 150 implements the function of the control unit 100 in the server 10. The CPU 150 is configured with a processor such as a microprocessor.

The ROM 152 stores programs and control data such as operation parameters which are used by the CPU 150.

The RAM 154 temporarily stores, for example, programs executed by the CPU 150.

The internal bus 156 is configured with a CPU bus or the like. The internal bus 156 connects the CPU 150, the ROM 152, and the RAM 154 with one another.

The interface 158 connects the storage device 160 and the communication device 162 to the internal bus 156. For example, the storage device 160 exchanges data with the CPU 150 via the interface 158 and the internal bus 156.

The storage device 160 is a data storage device functioning as the storage unit 122. Examples of the storage device 160 include a storage medium, a recording device that records data in a storage medium, a reading device that reads data from a storage medium, and a deleting device that deletes data recorded in a storage medium.

For example, the communication device 162 is a communication interface configured with a communication device that establishes a connection with a communication network such as a public network or the Internet. Further, the communication device 162 may be a wireless LAN support communication device, a Long Term Evolution (LTE) support communication device, or a wire communication device that performs wired communication. The communication device 162 functions as the communication unit 120.

«4. Modified Examples»

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modified Example 1>

For example, in the above embodiment, the example in which the touch gesture is basically performed by fingers of only one hand has been described, but the present disclosure is not limited to this example, and it may be performed by a combination of fingers of both hands. For example, in the touch gesture of sliding while touching with the fingers as illustrated in FIGS. 3 to 5, the left hand may be used for the thumb, and the right hand may be used for the index finger and the middle finger.

<4-2. Modified Example 2>

Further, when the touch position of the user on the operation surface 30 is set as a value in an XY direction and the touch force strength is set as a value in a Z direction, the server 10 is able to recognize a result of detecting a touch acquired from the operation surface 30 as three-dimensional information input by the user. For example, the server 10 recognizes the result of detecting the touch force of the finger as a positive value in the Z direction in a state in which only one finger is touching. Further, when a second finger newly touches in a state in which the first finger is touching, the server 10 recognizes a result of detecting the touch forces of the two fingers (or any one of the two fingers) as a negative value in the Z direction. According to this modified example, the operation surface 30 can be used as a three-dimensional information input device.

<4-3. Modified Example 3>

In the above embodiment, for example, the example in which the feedback display of feeding back the touch force strength or a candidate of an executable process is performed near the finger operated by the user has been described, but the present disclosure is not limited to this example. For example, the server 10 may cause the feedback display to be performed, for example, near a pointer, at a position at which the user is looking, or the like.

Further, when the user is looking at another screen while performing the touch operation, the server 10 may cause the feedback display to be performed on the screen at which the user is looking on the basis of, for example, a result of detecting a line of sight of the user or the like. For example, when the user drives an automobile having the above-described configuration of the control unit 100, if the user performs the touch operation on a screen (operation surface) of a car navigation device with the left hand, the control unit 100 may perform the feedback display near a windshield or a speedometer.

<4-4. Modified Example 4>

Further, in the above embodiment, the example in which the information processing device according to the present disclosure is the server 10 has been described, but the present disclosure is not limited to this example. Examples of the information processing device include a PC, a table type device, a smartphone, a tablet terminal, a wristwatch type computer, a car navigation device, and a game machine.

<4-5. Modified Example 5>

According to the present embodiment described above, it is also possible to provide a computer program causing hardware such as the CPU 150, the ROM 152, and the RAM 154 to implement functions equivalent to the components of the server 10. A recording medium on which the computer program is recorded is also provided.

Additionally, the present technology may also be configured as below.

(1)

An information processing device, including:

a processing executing unit configured to execute a predetermined process on the basis of a combination of results of detecting touch strengths of a plurality of fingers on an operation surface.

(2)

The information processing device according to (1), further including:

an output control unit configured to control an output of the results of detecting the touch strengths of the plurality of fingers.

(3)

The information processing device according to (2), in which the output control unit controls an output of a display, a sound, or a vibration indicating the results of detecting the touch strengths of the plurality of fingers.

(4)

The information processing device according to (3), in which the output control unit causes display indicating a result of detecting a touch strength of each of the plurality of fingers to be performed near a touch position of each of the plurality of fingers on the operation surface.

(5)

The information processing device according to (4), in which the output control unit increases a display area of the display indicating the result of detecting the touch strength of each of the plurality of fingers as a strength indicated by the result of detecting the touch strength of each of the plurality of fingers is increased.

(6)

The information processing device according to any one of (2) to (5), in which the output control unit further causes display indicating a candidate of a process associated with a result of detecting the plurality of fingers touching the operation surface to be performed on the operation surface.

(7)

The information processing device according to (6), in which the output control unit causes display indicating a candidate of a process associated with a result of detecting a touch strength of each of the plurality of fingers on the operation surface to be performed on a position associated with each of the plurality of fingers on the operation surface.

(8)

The information processing device according to any one of (1) to (7), further including:

a designation target specifying unit configured to specify an object which is designated by a user among objects displayed on the operation surface on the basis of a result of detecting the plurality of fingers touching the operation surface, in which the processing executing unit further executes the predetermined process on the basis of the object specified by the designation target specifying unit.

(9)

The information processing device according to any one of (1) to (8), in which the processing executing unit further executes the predetermined process on the basis of a result of detecting motions of the plurality of fingers on the operation surface.

(10)

The information processing device according to any one of (1) to (9), in which the processing executing unit further executes the predetermined process on the basis of a result of detecting the number of fingers touching the operation surface.

(11)

The information processing device according to any one of (1) to (10), in which the processing executing unit further executes the predetermined process on the basis of a result of detecting a type of finger touching the operation surface.

(12)

The information processing device according to any one of (1) to (11), further including:

a storage unit configured to store a combination of the touch strengths of the plurality of fingers and process identification information in association with each other, in which the processing executing unit executes a process indicated by the process identification information stored in the storage unit in association with a combination of the results of detecting the touch strengths of the plurality of fingers.

(13)

The information processing device according to (12), in which the process identification information includes display control information for switching an operation screen being displayed to a different type of operation screen, and the processing executing unit switches the operation screen displayed on the operation surface on the basis of the display control information stored in the storage unit in association with the combination of the results of detecting the touch strengths of the plurality of fingers.

(14)

The information processing device according to any one of (1) to (13), in which the touch strengths are touch force strengths of the plurality of fingers.

(15)

The information processing device according to any one of (1) to (13), in which the touch strengths are touch speeds of the plurality of fingers on the operation surface.

(16)

The information processing device according to any one of (1) to (15), in which the plurality of fingers include a first finger and a second finger, and the processing executing unit further executes the predetermined process on the basis of a change in a result of detecting contact states of the first finger and the second finger on the operation surface.

(17)

The information processing device according to any one of (1) to (16), in which the results of detecting the touch strengths of the plurality of fingers on the operation surface are detection results which are detected when there is a change in a touch strength or a contact state of one or more fingers among the plurality of fingers on the operation surface after the plurality of fingers touch the operation surface.

(18)

An information processing device, including:

a processing executing unit configured to execute a predetermined process on the basis of a change in a result of detecting contact states of a first finger and a second finger on an operation surface.

(19)

An information processing method, including:

executing, by a processor, a predetermined process on the basis of a combination of results of detecting touch strengths of a plurality of fingers on an operation surface.

(20)

A program causing a computer to function as:

a processing executing unit configured to execute a predetermined process on the basis of a combination of results of detecting touch strengths of a plurality of fingers on an operation surface.

REFERENCE SIGNS LIST 10 server
20 display unit
22 camera
26 display device
28 communication network
30 operation surface
100 control unit
102 detection result acquiring unit
104 processing executing unit
106 output control unit
108 designation target specifying unit
120 communication unit
122 storage unit

The invention claimed is:

1. An information processing device, comprising:
a processing executing unit configured to execute a predetermined process on the basis of a combination of results of detecting touch strengths of a plurality of fingers on an operation surface,
wherein the detecting is performed via a camera positioned above the operation surface,
wherein the touch strengths comprise touch force strengths of the plurality of fingers measured via image recognition on a deflection of the operation surface, and
wherein the processing execution unit is implemented via at least one processor.

2. The information processing device according to claim 1, further comprising:
an output control unit configured to control an output of the results of detecting the touch strengths of the plurality of fingers,
wherein the output control unit is implemented via at least one processor.

3. The information processing device according to claim 2,
wherein the output control unit controls an output of a display, a sound, or a vibration indicating the results of detecting the touch strengths of the plurality of fingers.

4. The information processing device according to claim 3,
wherein the output control unit causes display indicating a result of detecting a touch strength of each of the plurality of fingers to be performed near a touch position of each of the plurality of fingers on the operation surface.

5. The information processing device according to claim 4,
wherein the output control unit increases a display area of the display indicating the result of detecting the touch strength of each of the plurality of fingers as a strength indicated by the result of detecting the touch strength of each of the plurality of fingers is increased.

6. The information processing device according to claim 2,
wherein the output control unit further causes display indicating a candidate of a process associated with a result of detecting the plurality of fingers touching the operation surface to be performed on the operation surface.

7. The information processing device according to claim 6,
wherein the output control unit causes display indicating a candidate of a process associated with a result of detecting a touch strength of each of the plurality of fingers on the operation surface to be performed on a position associated with each of the plurality of fingers on the operation surface.

8. The information processing device according to claim 1, further comprising:
a designation target specifying unit configured to specify an object which is designated by a user among objects displayed on the operation surface on the basis of a result of detecting the plurality of fingers touching the operation surface,
wherein the processing executing unit further executes the predetermined process on the basis of the object specified by the designation target specifying unit, and
wherein the designation target specifying unit is implemented via at least one processor.

9. The information processing device according to claim 1,
wherein the processing executing unit further executes the predetermined process on the basis of a result of detecting motions of the plurality of fingers on the operation surface.

10. The information processing device according to claim 1,
wherein the processing executing unit further executes the predetermined process on the basis of a result of detecting the number of fingers touching the operation surface.

11. The information processing device according to claim 1,
wherein the processing executing unit further executes the predetermined process on the basis of a result of detecting a type of finger touching the operation surface.

12. The information processing device according to claim 1, further comprising:
a non-transitory computer-readable storage medium configured to store a combination of the touch strengths of the plurality of fingers and process identification information in association with each other,
wherein the processing executing unit executes a process indicated by the process identification information stored in the non-transitory computer-readable storage unit medium in association with a combination of the results of detecting the touch strengths of the plurality of fingers.

13. The information processing device according to claim 12,
wherein the process identification information includes display control information for switching an operation screen being displayed to a different type of operation screen, and
the processing executing unit switches the operation screen displayed on the operation surface on the basis of the display control information stored in the non-transitory computer-readable storage medium in association with the combination of the results of detecting the touch strengths of the plurality of fingers.

14. The information processing device according to claim 1, wherein the processing executing unit is further configured to execute a predetermined process on the basis of a result of detecting a length of time in which the plurality of fingers is touching the operation surface.

15. The information processing device according to claim 1,
wherein the touch strengths further comprise touch speeds of the plurality of fingers on the operation surface.

16. The information processing device according to claim 1,
wherein the plurality of fingers include a first finger and a second finger, and
the processing executing unit further executes the predetermined process on the basis of a change in a result of detecting contact states of the first finger and the second finger on the operation surface.

17. The information processing device according to claim 1,
wherein the results of detecting the touch strengths of the plurality of fingers on the operation surface are detection results which are detected when there is a change in a touch strengths or a contact state of one or more fingers among the plurality of fingers on the operation surface after the plurality of fingers touch the operation surface.

18. An information processing device, comprising:
a processing executing unit configured to execute a predetermined process on the basis of a change in a result of detecting contact states of a first finger and a second finger on an operation surface,
wherein the detecting is performed via a camera positioned above the operation surface,
wherein the contact states comprise touch force strengths of the first and second fingers measured via image recognition on a deflection of the operation surface, and
wherein the processing executing unit is implemented via at least one processor.

19. An information processing method, comprising:
executing, by a processor, a predetermined process on the basis of a combination of results of detecting touch strengths of a plurality of fingers on an operation surface,
wherein the detecting is performed via a camera which is positioned above the operation surface and wherein the touch strengths comprise touch force strengths of the plurality of fingers measured via image recognition on a deflection of the operation surface.

20. A non-transitory computer-readable medium having embodied thereon a program, which when executed by a computer causes the computer to execute a method, the method comprising:

executing a predetermined process on the basis of a combination of results of detecting touch strengths of a plurality of fingers on an operation surface, wherein the detecting is performed via a camera which is positioned above the operation surface, and wherein the touch strengths comprise touch force strengths of the plurality of fingers measured via image recognition on a deflection of the operation surface.

21. The information processing device according to claim 1, wherein the camera is positioned such that the fingers on the operation surface are located between the camera and the operation surface.

22. The information processing device according to claim 21, further comprising an arm section that is positioned above the operation surface, wherein the camera is installed in the arm section.

23. The information processing device according to claim 2, further comprising:

an arm section that is positioned above the operation surface; and a display unit configured to be controlled by the output control unit, wherein the display unit is installed in the arm section and projects an image onto the operation surface, and wherein the display unit is implemented via at least one processor.

* * * * *